United States Patent
Aminaka et al.

(10) Patent No.: US 6,485,798 B1
(45) Date of Patent: *Nov. 26, 2002

(54) OPTICAL COMPENSATORY SHEET COMPRISING SUBSTRATE AND OPTICALLY ANISOTROPIC LAYER

(75) Inventors: Eiichiro Aminaka; Ken Kawata; Shigeki Yokoyama, all of Minami-ashigara; Mitsuyoshi Ichihashi, Fujinomiya, all of (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/512,310

(22) Filed: Feb. 24, 2000

(30) Foreign Application Priority Data

| Mar. 16, 1999 | (JP) | 11-069951 |
| Mar. 31, 1999 | (JP) | 11-091163 |
| Mar. 31, 1999 | (JP) | 11-091291 |
| Feb. 1, 2000 | (JP) | 2000-024450 |

(51) Int. Cl.[7] .................. C09K 19/06; G02F 1/1335; G02F 1/1337
(52) U.S. Cl. .................. 428/1.1; 252/299.5; 349/117; 349/121; 428/1.3; 428/1.5
(58) Field of Search ............. 252/299.01, 299.5; 428/1.1, 1.3, 15; 349/117, 121

(56) References Cited

U.S. PATENT DOCUMENTS

| 3,848,966 | A | | 11/1974 | Smith et al. |
| 4,022,934 | A | | 5/1977 | Miller |
| 5,583,679 | A | * | 12/1996 | Ito et al. ..................... 349/118 |
| 5,736,067 | A | * | 4/1998 | Kawata et al. ........... 252/299.5 |
| 5,750,050 | A | | 5/1998 | Goodby et al. |
| 5,855,971 | A | | 1/1999 | Kobori et al. |
| 6,034,755 | A | | 3/2000 | Watanabe |
| 6,064,457 | A | | 5/2000 | Aminaka |
| 6,081,312 | A | | 6/2000 | Aminaka et al. |
| 6,084,652 | A | * | 7/2000 | Yamahara et al. .......... 349/136 |
| 6,245,398 | B1 | * | 6/2001 | Matsuoka et al. ........... 428/1.3 |
| 6,338,808 | B1 | * | 1/2002 | Kawata et al. ........... 252/299.4 |

FOREIGN PATENT DOCUMENTS

| JP | 54-103795 | 8/1979 |
| JP | 07-325221 | 12/1995 |
| JP | 09-230354 | 9/1997 |
| JP | 2000-345164 | 12/2000 |

OTHER PUBLICATIONS

U. DAHN et al. "Fluoroalkylated discotic liquid crystals, " CAPLUS 1995:991736.

* cited by examiner

*Primary Examiner*—Shean C. Wu
(74) *Attorney, Agent, or Firm*—Burns, Doane, Swecker & Mathis, LLP

(57) ABSTRACT

An optical compensatory sheet comprises a transparent substrate and an optically anisotropic layer. The optically anisotropic layer comprises discotic liquid crystal molecules. The discotic liquid crystal molecules are oriented in essentially mono domain alignment at an average inclined angle in the range of 50° to 90°. A liquid crystal display of an STN mode having the optical compensatory sheet is also disclosed.

16 Claims, 6 Drawing Sheets

(a) (b) (c)

22　　22　　22

OPTICAL COMPENSATORY SHEET COMPRISING SUBSTRATE AND OPTICALLY ANISOTROPIC LAYER

FIELD OF THE INVENTION

The present invention relates to an optical compensatory sheet comprising a transparent substrate and an optically anisotropic layer comprising discotic liquid crystal molecules. The invention also relates to a liquid crystal display of an STN mode equipped with the optical compensatory sheet.

BACKGROUND OF THE INVENTION

A liquid crystal display of an STN mode comprises a liquid crystal cell of an STN (Super Twisted Nematic) mode, two polarizing elements placed on both sides of the liquid crystal cell, and one or two optical compensatory sheets (phase retarders) placed between the liquid crystal cell and the polarizing element.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecule. Each of the substrates has an orientation layer, which has a function of aligning the rod-like liquid crystal molecules. The rod-like liquid crystal molecules are twisted by using a chiral agent. A twist angle of the molecules is in the range of 90° to 360°.

Without an optical compensatory sheet, a liquid crystal display of an STN mode gives an image colored blue or yellow because of birefringence of rod-like liquid crystal molecules. The blue or yellow color is inconvenient for not only a black and white image but also a color image. An optical compensatory sheet has a function of removing color from an image to display a bright and clear image. The optical compensatory sheet also has a function of enlarging a viewing angle of a liquid crystal cell. As the optical compensatory sheet, a stretched birefringent film has been usually used. Japanese Patent Provisional Publication Nos. 7(1995)-104284 and 7(1995)-13021 disclose an optical compensatory sheet made of a stretched birefringent film for a liquid crystal display of an STN mode.

In place of the stretched birefringent film, an optical compensatory sheet comprising an optically anisotropic layer on a transparent substrate has been proposed. The optically anisotropic layer is formed by aligning discotic liquid crystal molecules and fixing the aligned molecules. The discotic liquid crystal molecules usually have large birefringence and various alignment forms. Accordingly, an optical compensatory sheet obtained by using the discotic liquid crystal molecule has a specific optical characteristic that cannot be obtained by the conventional stretched birefringent film. The optical compensatory sheet using the discotic liquid crystal molecule is disclosed in Japanese Patent Provisional Publication No. 6(1994)-214116, U.S. Pat. Nos. 5,583,679, 5,646,703 and German Patent Publication No. 3,911,620A1. However, the disclosed optical compensatory sheet is designed to be used in a liquid crystal display of a TN (Twisted Nematic) mode.

The optical compensatory sheet containing the discotic liquid crystal molecules should be redesigned to be used in a liquid crystal display of an STN mode. In a liquid crystal cell of the STN mode, rod-like liquid crystal molecules are aligned according to a super twisted birefringent mode at a twist angle of larger than 90°. The liquid crystal display of the STN mode can give a clear image with a large capacity according to a time-sharing addressing method, even if the display has a simple matrix electrode structure (having no active matrix such as a thin film transistor or a diode).

The discotic liquid crystal molecules should be essentially vertically aligned (homogeneously aligned) to optically compensate the liquid crystal cell of the STN mode. The discotic liquid crystal molecules are preferably further twisted. Japanese Patent Provisional Publication No. 9(1997)-26572 discloses an optical compensatory sheet in which discotic liquid crystal molecules are twisted. The drawings of Japanese Patent Provisional Publication No. 9(1997)-26572 further illustrate that the discotic liquid crystal molecules are essentially vertically aligned.

SUMMERY OF THE INVENTION

It is technically difficult to align discotic liquid crystal molecules uniformly (i.e., to orient the molecules in mono domain alignment) from the interface facing an orientation layer to the opposite interface facing the air, according to the disclosures of Japanese Patent Provisional Publication No. 9(1997)-26572. If the discotic liquid crystal molecules are not uniformly aligned (oriented in dual domain alignment), disclination of the molecules scatters light to decrease a contrast ratio of a displayed image.

Rod-like liquid crystal molecules used in a liquid crystal cell have been investigated to align the molecules essentially vertically (homeotropic alignment). For example, a liquid crystal display of a vertical alignment (VA) mode uses an orientation layer having a function of essentially vertically aligning rod-like liquid crystal molecules. In the liquid crystal display of the VA mode, rodlike liquid crystal molecules are essentially vertically aligned while voltage is not applied to the cell, and are essentially horizontally aligned while voltage is applied to the cell. Various orientation layers have been proposed to align rod-like liquid crystal molecules.

However, the orientation layer for rod-like liquid crystal molecules cannot sufficiently orient the discotic liquid crystal molecules to form uniform mono domain alignment from an interface facing the orientation layer to the opposite interface facing the air.

An object of the present invention is to provide an optical compensatory sheet particularly suitable for a liquid crystal display of an STN mode.

Another object of the invention is to provide an optical compensatory sheet in which discotic liquid crystal molecules are oriented essentially vertically (homogeneously) and uniformly in mono domain alignment.

A further object of the invention is to provide a liquid crystal display of an STN mode that can display a clear image of a high contrast, in which blue or yellow color caused by birefringence is reduced.

The present invention provides an optical compensatory sheet which comprises a transparent substrate and an optically anisotropic layer comprising discotic liquid crystal molecules, wherein the discotic liquid crystal molecules are oriented in essentially mono domain alignment at an average inclined angle of 50° to 90°, said average inclined angle being an average of angles between discotic planes of said discotic liquid crystal molecules and a surface of said transparent substrate.

The invention also provides a liquid crystal display comprising a liquid crystal cell of an STN mode, two polarizing elements placed on both sides of the liquid crystal cell, and one or two optical compensatory sheets placed between the liquid crystal cell and the polarizing element; wherein the optical compensatory sheet comprises a transparent substrate and an optically anisotropic layer comprising discotic liquid crystal molecules in this order from the polarizing element side, said discotic liquid crystal molecules being oriented in essentially mono domain alignment at an average inclined angle of 50° to 90° and further being twisted at a twist angle of 90° to 360°, and said average inclined angle being an average of angles between discotic planes of said discotic liquid crystal molecules and a surface of said transparent substrate.

In the present specification, the term "average inclined angle" means an average of angles between discotic planes of discotic liquid crystal molecules and a surface of a transparent substrate (or a surface of an orientation layer). The present specification refers to alignment of liquid crystal molecules at an average inclined angle in the range of 50° to 90° as essentially vertical alignment of the molecules.

It can be easily confirmed by observation with a polarizing microscope whether discotic liquid crystal molecules are oriented in mono domain alignment or not (in dual domain alignment).

The applicants have succeeded in aligning discotic liquid crystal molecules essentially vertically (homogeneously) and uniformly in mono domain alignment.

For example, the discotic liquid crystal molecules can be thus aligned by using an appropriate amount of a specific additive (cellulose esters or alignment promoters) and by controlling the temperature for alignment. Without either using the additives or controlling the aligning temperature, the liquid crystal molecules are aligned in dual domain alignment.

An optical compensatory sheet suitable for a liquid crystal display of an STN mode is now obtained by using the discotic liquid crystal molecules in essentially vertical, uniform and stable alignment. Accordingly, blue or yellow color can be reduced in a liquid crystal display of an STN mode. Therefore, the liquid crystal display of an STN mode can give a clear image with a high contrast by using the optical compensatory sheet in which the discotic liquid crystal molecules are essentially vertically oriented in essentially mono domain alignment (and are preferably twisted).

DETAILED DESCRIPTION OF THE INVENTION

Figure 1:
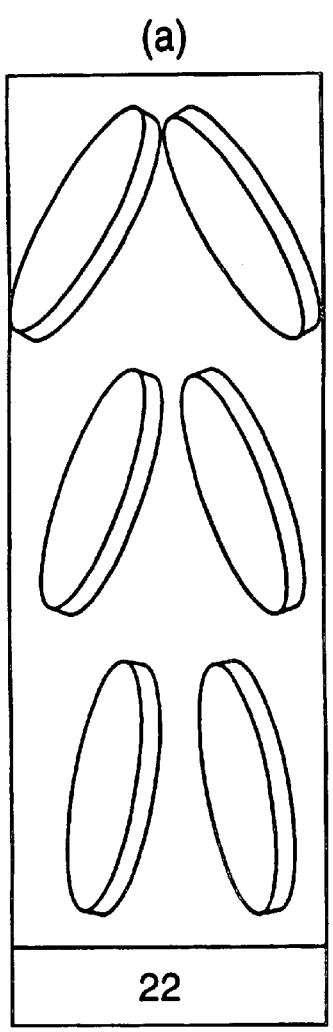
FIG. 1 schematically illustrates discotic liquid crystal molecules vertically oriented in essentially dual domain alignment or in essentially mono domain alignment.
Figure 1:
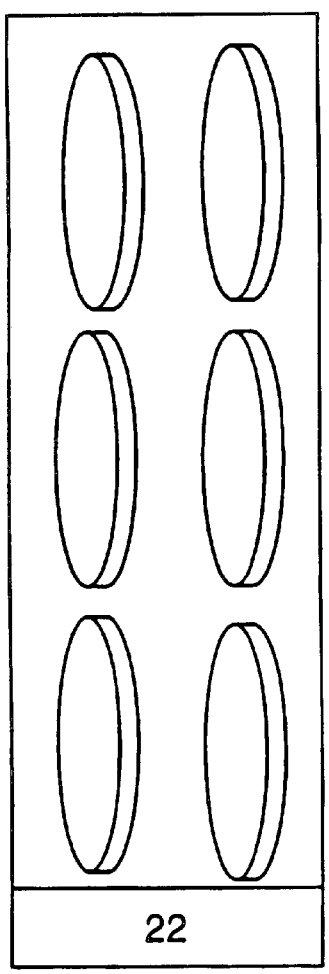
Figure 1:
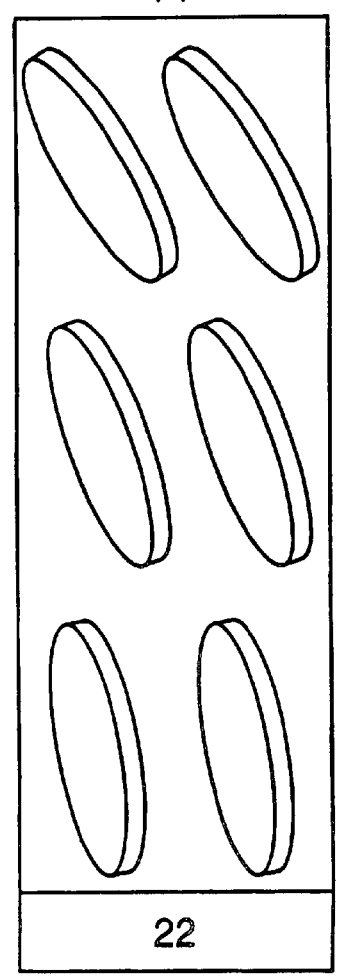

FIG. 1 schematically illustrates discotic liquid crystal molecules vertically oriented in essentially dual domain alignment or in essentially mono domain alignment.

In FIG. 1(a), the discotic liquid crystal molecules are aligned vertically in dual domain alignment at the average inclined angle of 90°. Though each of the molecules has an inclined angle of 60° to 80°, they form pairs inclined toward opposite directions (i.e., they are aligned in dual domain alignment). Therefore, the average inclined angle is 90° in total. In general, the molecules near the orientation layer (22) have large inclined angles (e.g., 80° in the figure) and those on the opposite side (near the interface facing the air) have small inclined angles (e.g., 60° in the figure). Discotic liquid crystal molecules substantially vertically aligned in prior arts are thought to form the dual domain alignment shown in the figure. The discotic liquid crystal molecules oriented in the dual domain alignment scatter light because of the disclination.

In FIG. 1(b), the discotic liquid crystal molecules are aligned vertically in mono domain alignment at the average inclined angle of 90°. Each of the molecules has the inclined angle of 90°.

In FIG. 1(c), the discotic liquid crystal molecules are aligned in mono domain alignment at the average inclined angle of 70°. Each of the molecules has an inclined angle of 60° to 80°. In contrast to FIG. 1(a), the molecules in FIG. 1(c) incline toward the same direction (i.e., they are oriented in mono domain alignment), and the average inclined angle is 70° in total.

The light-scattering caused by the disclination can be prevented by the discotic liquid crystal molecules oriented in mono domain alignment shown in FIGS. 1(b) or (c).

Figure 2:
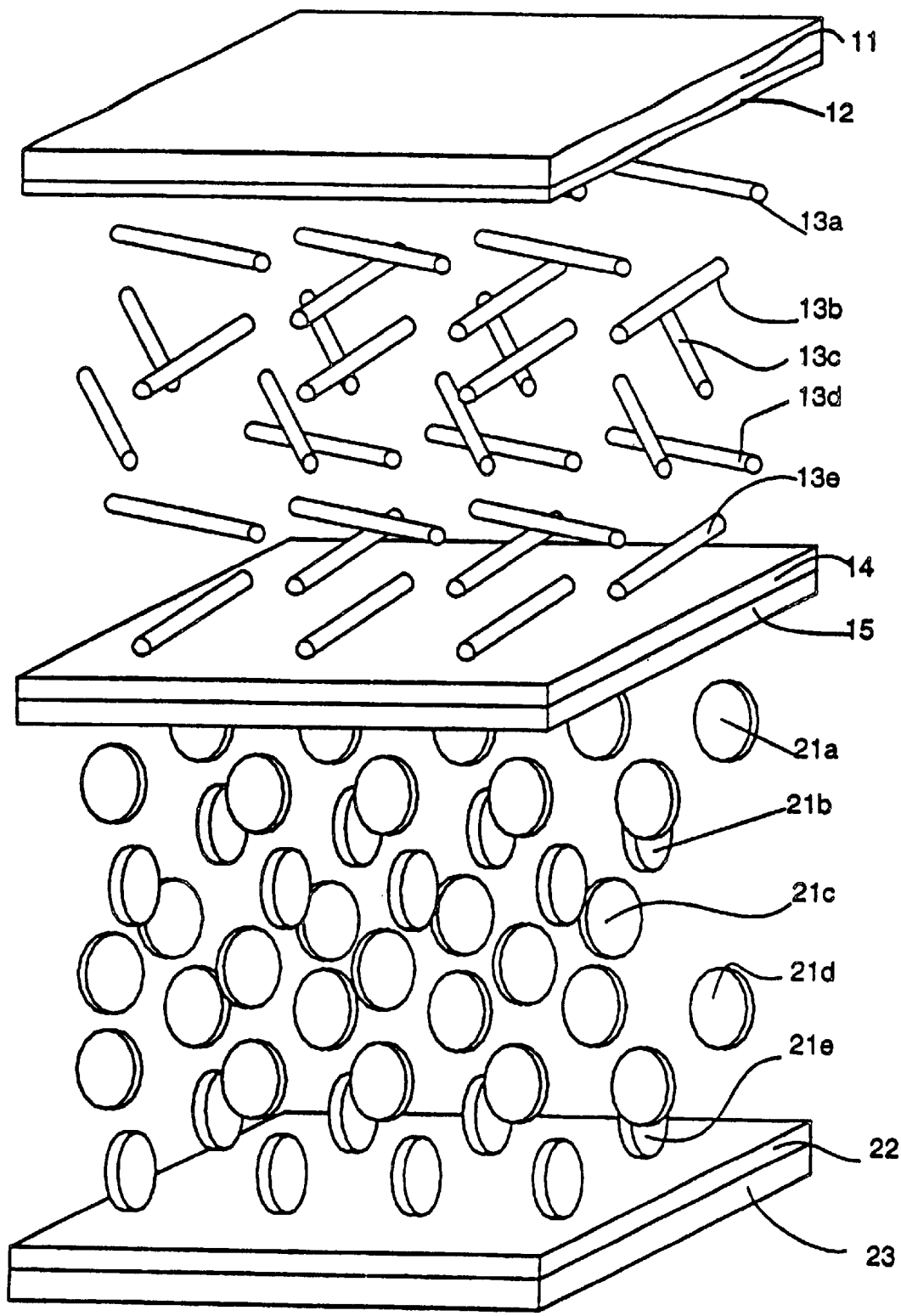
FIG. 2 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

FIG. 2 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

As is shown in FIG. 2, a liquid crystal cell (11 to 15) comprises an upper substrate (11) having an upper orientation layer (12), a lower substrate (15) having a lower orientation layer (14) and a liquid crystal layer comprising rod-like liquid crystal molecules (13a to 13e) sealed between the orientation layers (12 & 14). The rod-like liquid crystal molecules (13a to 13e) are aligned by functions of the orientation layers (12 & 14), and are twisted by a function of a chiral agent (not shown) contained in the liquid crystal layer.

Each of the upper substrate (11) and the lower substrate (15) has an electrode (not shown), which has a function of applying voltage to the rod-like liquid crystal molecules (13a to 13e).

When voltage is not applied to the liquid crystal cell of an STN mode (off), the rod-like liquid crystal molecules (13a to 13e) are essentially horizontally aligned parallel to the surface of the orientation layers (12 & 14), as is shown in FIG. 2. The rod-like liquid crystal molecules (13a to 13e) are twisted along a thickness direction, and spiral on a plane (counterclockwise about 240° from 13a to 13e in FIG. 2).

When voltage is applied to the liquid crystal cell of an STN mode (on), rod-like liquid crystal molecules placed in the middle of the cell (13b to 13d) are rather vertically aligned (realigned parallel to a direction of an electric field), compared with FIG. 2 (off). On the other hand, the alignment of the other rod-like liquid crystal molecules (13a, 13e) neighboring the substrates (11, 15) is not essentially changed after applying voltage to the cell.

An optical compensatory sheet is provided under the liquid crystal cell. The optical compensatory sheet shown in FIG. 2 comprises a transparent substrate (23), an orientation layer (22) and an optically anisotropic layer in order. The optically anisotropic layer is formed by aligning discotic liquid crystal molecules (21a to 21e) and fixing the molecules while the alignment is maintained.

According to the present invention, discotic liquid crystal molecules (21a to 21e) are so aligned that discotic planes of the molecules are essentially perpendicular to a surface of the orientation layer (22). The discotic liquid crystal molecules (21a to 21e) are preferably twisted along a thickness direction, and spiral on a plane (clockwise about 240° from 21a to 21e in FIG. 2).

In FIG. 2, alignment of each of the rod-like liquid crystal molecules corresponds to alignment of each of the discotic liquid crystal molecules, namely 13a to 21e, 13b to 21d, 13c to 21c, 13d to 21b and 13e to 21a. Accordingly, the discotic liquid crystal molecule 21e optically compensates the rod-like liquid crystal molecule 13a, 21d compensates 13b, 21c compensates 13c, 21b compensates 13d, and 21a compensates 13e. The optical relation between the rod-like liquid crystal molecule and the discotic liquid crystal molecule is described below referring to FIG. 3.

Figure 3:
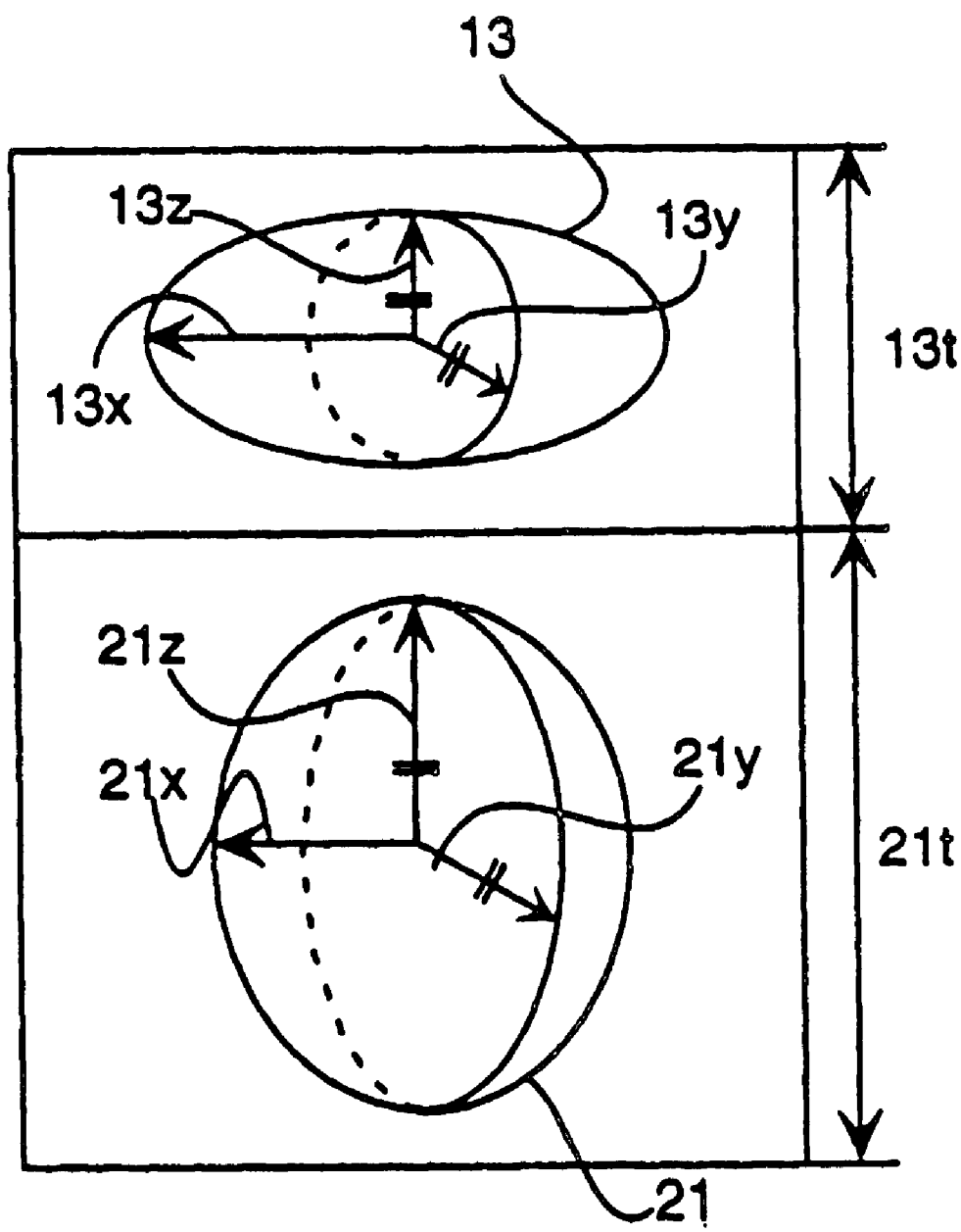
FIG. 3 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

FIG. 3 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

The refractive index ellipsoid (13) of a rod-like liquid crystal molecule in a liquid crystal cell is formed by refractive indices (13x, 13y) in plane parallel to an orientation layer and a refractive index (13z) along a thickness direction. In a liquid crystal cell of an STN mode, the refractive index (13x) along one direction in place is relatively large, while the index (13y) along a direction perpendicular to the direction of (13x) is relatively small. The refractive index (13z) along the thickness direction is also relatively small in a liquid crystal cell of an STN mode. Therefore, the refractive index ellipsoid (13) has a shape like a laid football, as is shown in FIG. 3. The liquid crystal cell having the refractive index ellipsoid (not spherical) shows a birefringence depending on a viewing angle. The dependency on the viewing angle is canceled by an optical compensatory sheet.

The refractive index ellipsoid (21) of a discotic liquid crystal molecule in an optical compensatory sheet is also formed by refractive indices (21x, 21y) in plane parallel to an orientation layer and a refractive index (21z) along a thickness direction. The refractive index (21x) along one direction in place is relatively small, while the index (21y) along a direction perpendicular to the direction of (21x) is relatively large. The refractive index (21z) along the direction is also relatively large. These refractive indices are obtained by aligning a discotic liquid crystal molecule essentially vertically. Therefore, the refractive index ellipsoid (21) has a shape like a standing disk, as is shown in FIG. 3.

A retardation formed in a liquid crystal cell (1) can be compensated by a retardation formed in an optical compensatory sheet (2) because of the above-described relation. The dependency on a viewing angle of the liquid crystal cell can be canceled by adjusting optical characteristics of a rod-like liquid crystal molecule and a discotic liquid crystal molecule that has a director having the same direction as that of the rod-like liquid crystal molecule. In more detail, the dependency on a viewing angle can be canceled by adjusting refractive indices (13x, 13y, 13z) of a rod-like liquid crystal molecule, refractive indices (21x, 21y, 21z) of a discotic liquid crystal molecule, a thickness (13t) of the rod-like liquid crystal molecule layer and a thickness (21t) of the discotic liquid crystal molecule layer according to the following formulas:

$$|(13x-13y) \times 13t| = |(21x-21y) \times 21t|$$

$$|(13x-13z) \times 13t| = |(21x-21z) \times 21t|.$$

Figure 4:
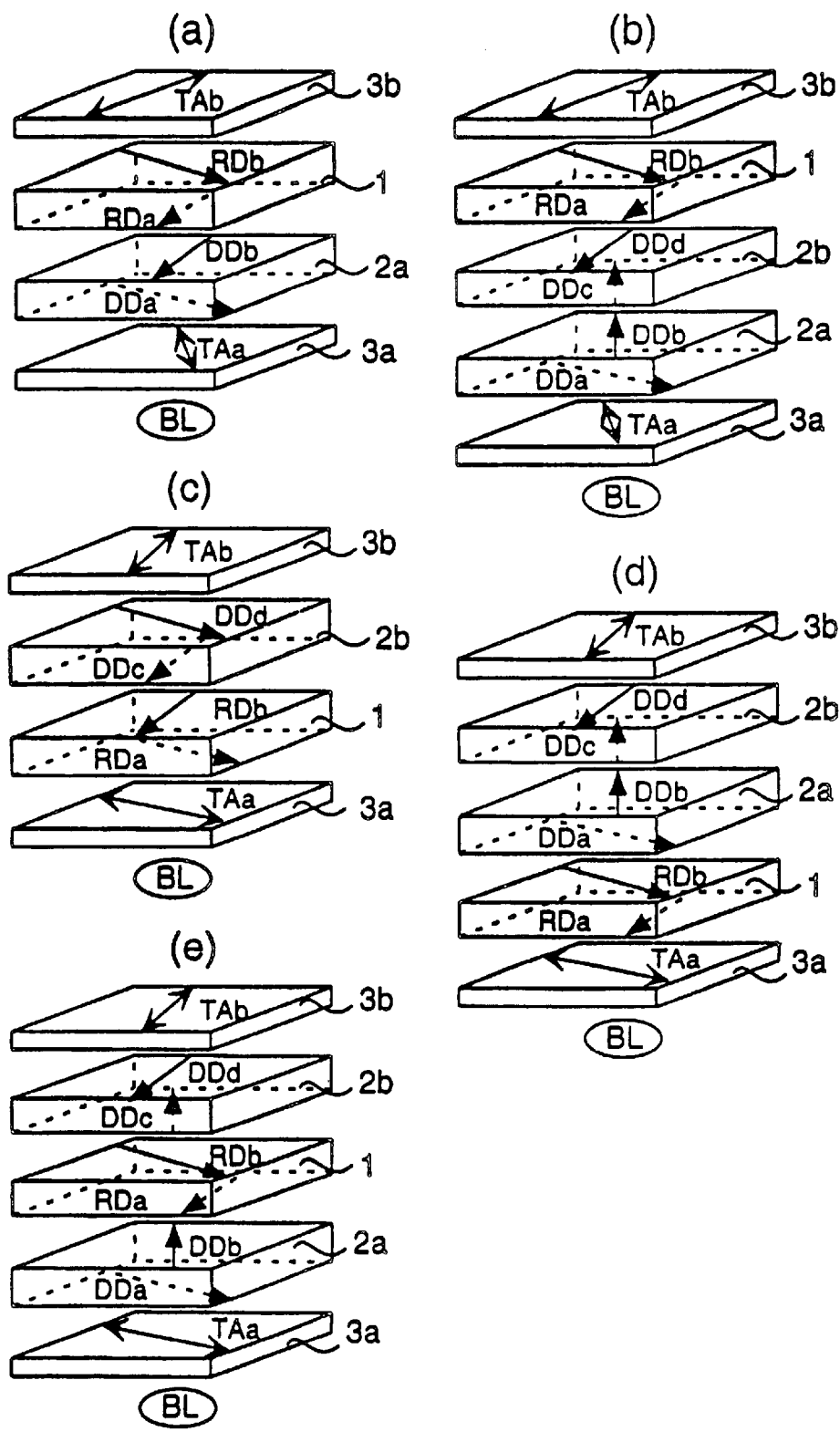
FIG. 4 schematically illustrates some layered structures of a liquid crystal display of an STN mode.

FIG. 4 schematically illustrates a layered structure of a liquid crystal display of an STN mode.

The liquid crystal display shown in FIG. 4(a) comprises a backlight (BL), a lower polarizing element (3a), a lower optical compensatory sheet (2a), a liquid crystal cell of an STN mode (1) and an upper polarizing element (3b) in order.

The liquid crystal display shown in FIG. 4(b) comprises a backlight (BL), a lower polarizing element (3a), a lower optical compensatory sheet (2a), an upper optical compensatory sheet (2b), a liquid crystal cell of an STN mode (1) and an upper polarizing element (3b) in order.

The liquid crystal display shown in FIG. 4(c) comprises a backlight (BL), a lower polarizing element (3a), a liquid crystal cell of an STN mode (1) an upper optical compensatory sheet (2b) and an upper polarizing element (3b) in order.

The liquid crystal display shown in FIG. 4(d) comprises a backlight (BL), a lower polarizing element (3a), a liquid crystal cell of an STN mode (1), a lower optical compensatory sheet (2a), an upper optical compensatory sheet (2b) and an upper polarizing element (3b) in order.

The liquid crystal display shown in FIG. 4(e) comprises a backlight (BL), a lower polarizing element (3a), a lower optical compensatory sheet (2a), a liquid crystal cell of an STN mode (1), an upper optical compensatory sheet (2b) and an upper polarizing element (3b) in order.

FIG. 4 shows arrows indicating the following optical directions.

DDa: Normal (director's) direction of a discotic plane of a discotic liquid crystal molecule at a lower polarizing element in a lower optical compensatory sheet (2a).

DDb: Normal (director's) direction of a discotic plane of a discotic liquid crystal molecule at an upper polarizing element in a lower optical compensatory sheet (2a).

RDa: Rubbing direction of a lower orientation layer of a liquid crystal cell (1).

RDb: Rubbing direction of an upper orientation layer of a liquid crystal cell (1).

DDc: Normal (director's) direction of a discotic plane of a discotic liquid crystal molecule at a lower polarizing element in an upper optical compensatory sheet (2b).

DDd: Normal (director's) direction of a discotic plane of a discotic liquid crystal molecule at an upper polarizing element in an upper optical compensatory sheet (2b).

TAa: Transparent axis of a lower polarizing element (3a).

TAb: Transparent axis of an upper polarizing element (3b).

The angles between the optical directions are described below referring to FIG. 5 and FIG. 6.

Figure 5:
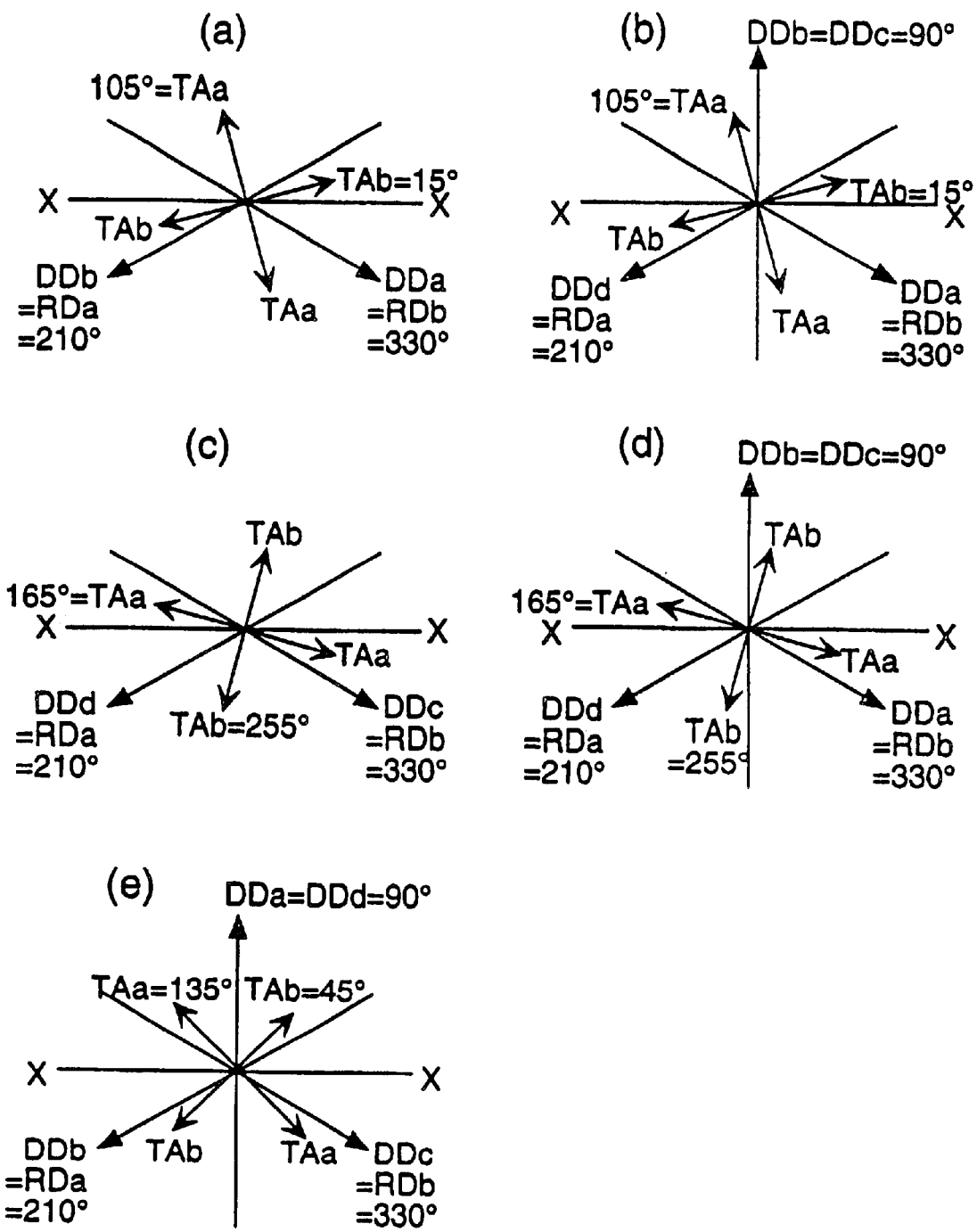
FIG. 5 is a plane view showing preferred optical directions about elements of a liquid crystal display of an STN mode.

FIG. 5 is a plane view showing preferred optical directions about elements of a liquid crystal display of an STN mode. FIG. 5 shows arrangements taking account of a front contrast.

FIG. 5(a) shows preferred optical directions in a liquid crystal display comprising one optical compensatory sheet between a lower polarizing element and a liquid crystal cell of an STN mode, as is shown in FIG. 4(a).

FIG. 5(b) shows preferred optical directions in a liquid crystal display comprising two optical compensatory sheets between a lower polarizing element and a liquid crystal cell of an STN mode, as is shown in FIG. 4(b).

FIG. 5(c) shows preferred optical directions in a liquid crystal display comprising one optical compensatory sheet between a liquid crystal cell of an STN mode and an upper polarizing element, as is shown in FIG. 4(c).

FIG. 5(d) shows preferred optical directions in a liquid crystal display comprising two optical compensatory sheets between a liquid crystal cell of an STN mode and an upper polarizing element, as is shown in FIG. 4(d).

FIG. 5(e) shows preferred optical directions in a liquid crystal display comprising one optical compensatory sheet between a lower polarizing element and a liquid crystal display of an STN mode, and another optical compensatory sheet between the liquid crystal cell and an upper polarizing element, as is shown in FIG. 4(e).

In FIG. 5, the line (X—X) means a standard direction (0°). The arrows shown in FIG. 5 have the same meanings as is described about FIG. 4. The transparent axis of the lower polarizing element (TAa) and the transparent axis of the upper polarizing element (TAb) can be replaced with each other.

Figure 6:
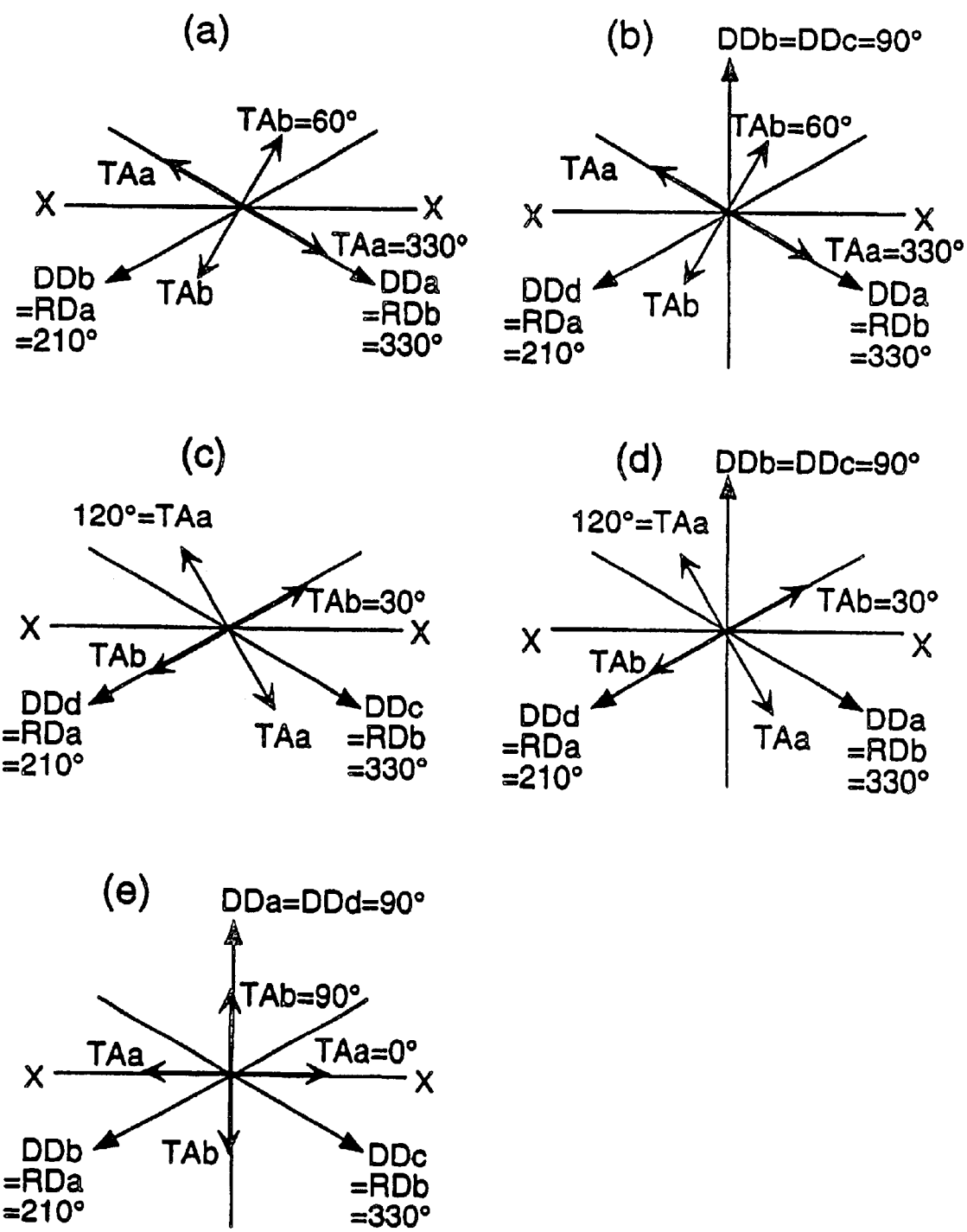
FIG. 6 is a plane view showing other preferred optical directions about elements of a liquid crystal display of an STN mode.

FIG. 6 is a plane view showing other preferred optical directions about elements of a liquid crystal display of an STN mode. FIG. 6 shows arrangements taking account of color of a displayed image.

FIG. 6(a) shows preferred optical directions in a liquid crystal display comprising one optical compensatory sheet between a lower polarizing element and a liquid crystal cell of an STN mode, as is shown in FIG. 4(a).

FIG. 6(b) shows preferred optical directions in a liquid crystal display comprising two optical compensatory sheets between a lower polarizing element and a liquid crystal cell of an STN mode, as is shown in FIG. 4(b).

FIG. 6(c) shows preferred optical directions in a liquid crystal display comprising one optical compensatory sheet between a liquid crystal cell of an STN mode and an upper polarizing element, as is shown in FIG. 4(c).

FIG. 6(d) shows preferred optical directions in a liquid crystal display comprising two optical compensatory sheets between a liquid crystal cell of an STN mode and an upper polarizing element, as is shown in FIG. 4(d).

FIG. 6(e) shows preferred optical directions in a liquid crystal display comprising one optical compensatory sheet between a lower polarizing element and a liquid crystal display of an STN mode, and another optical compensatory sheet between the liquid crystal cell and an upper polarizing element, as is shown in FIG. 4(e).

In FIG. 6, the line (X—X) means a standard direction (0°). The arrows shown in FIG. 6 have the same meanings as is described about FIG. 4. The transparent axis of the lower polarizing element (TAa) and the transparent axis of the upper polarizing element (TAb) can be replaced with each other.

[Transparent Substrate]

A transparent substrate is preferably made of a polymer film, which more preferably is optical isotropic. The term "transparent" means that light transmittance is not less than 80%. The term "optical isotropic" means that a retardation in plane (Re) of the film is not more than 20 nm, preferably not more than 10 nm, and more preferably not more than 5 nm. A retardation along a thickness direction (Rth) of the film is preferably not more than 100 nm, more preferably not more than 50 nm, and most preferably not more than 30 nm. The Re and Rth retardation values are defined by the following formulas:

$$Re=(nx-ny)\times d$$

$$Rth=[\{(nx+ny)/2\}-nz]\times d$$

in which each of nx and ny is a refractive index in plane of the transparent substrate; nz is a refractive index along a thickness direction of the transparent substrate; and d is a thickness of a transparent substrate.

Examples of the polymers include cellulose ester, polycarbonate, polysulfone, polyethersulfone, polyacrylate and polymethacrylate. Cellulose ester is preferred, cellulose acetate is more preferred, and cellulose triacetate is most preferred. The polymer film is formed preferably according to a solvent casting method.

The transparent substrate has a thickness preferably in the range of 20 to 500 μm. and more preferably in the range of 50 to 200 μm.

The transparent substrate can be subjected to a surface treatment (e.g., glow discharge treatment, corona discharge treatment, ultraviolet (UV) treatment, flame treatment) to improve adhesion to a layer formed on the substrate (e.g., adhesive layer, orientation layer, optically anisotropic layer). An adhesive layer (undercoating layer) can be provided on the transparent substrate.

[Orientation Layer]

Discotic liquid crystal molecules can be essentially vertically (homogeneously) aligned by decreasing a surface energy of the orientation layer to erect a liquid crystal molecule. In the concrete, a functional group decreasing the surface energy is introduced into the polymer for the orientation layer. A hydrocarbon group containing 10 or more carbon atoms can be effectively used as the functional group. The functional group is preferably introduced into the side chain rather than the main chain of the polymer. The hydrocarbon group is an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). As the cycloalkyl or cycloalkenyl group, an aliphatic group having a steroid ring is preferred. As the aromatic group, a group having a tolan structure or a biphenyl structure is preferred. The hydrocarbon group can have a substituent group that is not strongly hydrophilic, such as a halogen atom. The hydrocarbon group preferably contains 10 to 100 carbon atoms, more preferably 10 to 60 carbon atoms, and further preferably 10 to 40 carbon atoms.

The main chain of the polymer preferably has a polyimide structure, a polyvinyl alcohol structure, or a poly(meth) acrylic structure.

A polyimide can be generally synthesized by a condensation reaction between a tetracarboxylic acid and a diamine. From plural tetracarboxylic acids or diamines, a polyimide corresponding to a copolymer may be synthesized. The hydrocarbon groups may be placed at the repeating units derived from the tetracarboxylic acid and/or at that derived from the amine.

In the case that the hydrocarbon group is introduced into the polyimide, it is particularly preferred that the main or side chain of the polyimide should have a steroid structure. The steroid structure of the side chain corresponds to the hydrocarbon group containing 10 or more carbon atoms. Therefore, the steroid structure can essentially vertically (homogeneously) align the discotic liquid crystal molecules.

In the present specification, the steroid structure means a cyclopentanohydrophenanthrene ring or a ring obtained by replacing a single bond of the cyclopentanohydrophenanthrene ring with a double bond so long as the ring is aliphatic (not forming an aromatic ring).

Also a denatured polyvinyl alcohol having a hydrocarbon group containing 10 or more carbon atoms can align the discotic liquid crystal molecules essentially vertically (homogeneously). The hydrocarbon group may be an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). The hydrocarbon group can have a substituent group that is not strongly hydrophilic, such as a halogen atom. The hydrocarbon group contains 10 to 100 carbon atoms, preferably 10 to 60 carbon atoms, and more preferably 10 to 40 carbon atoms.

The denatured polyvinyl alcohol having a hydrocarbon group comprises hydrocarbon repeating units preferably in an amount of 2 to 80 mol %, and more preferably in an amount of 3 to 70 mol %. The repeating unit has a hydrocarbon group containing 10 or more carbon atoms.

A preferred denatured polyvinyl alcohol having a hydrocarbon group containing 10 or more carbon atoms is represented by the formula (PV):

—(VAl)$_x$—(HyC)$_y$-(VAc)$_z$-                              (PV)

in which VAl is a vinyl alcohol repeating unit; HyC is a repeating unit having a hydrocarbon group containing 10 or more carbon atoms; VAc is a vinyl acetate repeating unit; x is 20 to 95 mol % (preferably 25 to 90 mol %); y is 2 to 80 mol % (preferably 3 to 70 mol %); and z is 0 to 30 mol % (preferably 2 to 20 mol %).

Preferred repeating units having a hydrocarbon group containing 10 or more carbon atoms (HyC) are represented by the formulas (HyC-I) and (HyC-II):

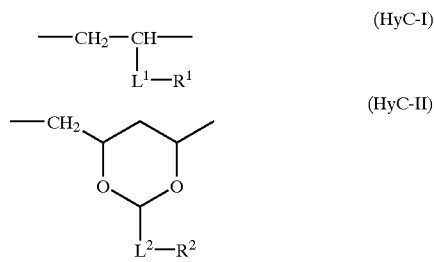

in which $L^1$ is a divalent linking group selected from the group consisting of —O—, —CO—, —SO$_2$—, —NH—, -alkylene-, -arylene- and a combination thereof; $L^2$ is a single bond or a divalent linking group selected from the group consisting of —O—, —CO—, —SO$_2$—, —NH—, -alkylene-, -arylene- and a combination thereof; and each of $R^1$ and $R^2$ is a hydrocarbon group containing 10 or more carbon atoms.

Examples of the divalent linking groups formed by the combinations are shown below.

L1: —O—CO—
L2: —O—CO-alkylene-O—
L3: —O—CO-alkylene-CO—NH—
L4: —O—CO-alkylene-NH—SO$_2$-arylene-O—
L5: -arylene-NH—CO—
L6: -arylene-CO—O—
L7: -arylene-CO—NH—
L8: -arylene-O—
L9: —O—CO—NH-arylene-NH—CO—

A preferred denatured poly(meth)acrylic acid having a hydrocarbon group containing 10 or more carbon atoms is represented by the formula (PA):

—(VAA)$_x$—(HyC)$_y$—                                   (PA)

in which VAA is a (meth)acrylic repeating unit; HyC is a repeating unit having a hydrocarbon group containing 10 or more carbon atoms; x is 20 to 98 mol % (preferably 30 to 97 mol %); and y is 2 to 80 mol % (preferably 3 to 70 mol %)

The definition and examples of HyC are the same as those described above for a denatured polyvinyl alcohol.

The polymer for the orientation layer preferably has a polymerization degree of 200 to 5,000 (more preferably 300 to 3,000) and a molecular weight of 9,000 to 200,000 (more preferably 13,000 to 130,000). Two or more kinds of the polymers can be used in combination.

The orientation layer is preferably formed by rubbing the polymer. The rubbing treatment can be conducted by rubbing a layer containing the aforementioned polymer with paper or cloth several times along a certain direction.

After essentially vertically (homogeneously) aligning discotic liquid crystal molecules by the orientation layer, the aligned molecules are fixed while the alignment of the liquid crystal molecules is maintained, to form an optically anisotropic layer. The thus formed optically anisotropic layer can be alone transferred (without the orientation layer) onto a polymer film (or a transparent substrate) because the liquid crystal molecules can keep the alignment without the orientation layer. Therefore, the optical compensatory sheet of the invention does not need to comprise an orientation layer (though the orientation layer is necessary for preparing the optical compensatory sheet).

[Optically Anisotropic Layer]

The optically anisotropic layer contains discotic liquid crystal molecules. In the optically anisotropic layer, discotic planes of the discotic liquid crystal molecules are aligned essentially vertically to the orientation layer (at an average inclined angle in the range of 50° to 90°). The discotic liquid crystal molecules are preferably fixed in the optical anisotropic layer to keep the vertical (homogeneous) alignment. The discotic liquid crystal molecules are preferably fixed by a polymerization reaction.

The discotic liquid crystal molecule is described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

A polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, a linking group is introduced to between them, and hence the discotic liquid crystal molecule having a polymerizable group (polymerizable discotic liquid crystal molecule) preferably is a compound represented by the following formula:

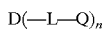

D(—L—Q)$_n$ in which D is a discotic core; L is a divalent linking group; Q is a polymerizable group; and n is an integer of 4 to 12.
Examples of the discotic cores (D) are shown below. In the examples, LQ (or QL) means the combination of the divalent linking group (L) and the polymerizable group (Q).
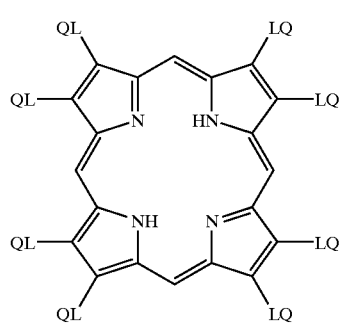
(D1)
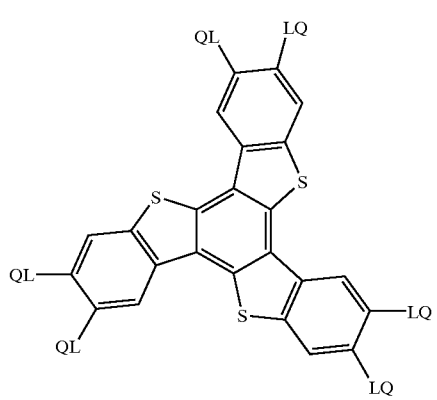
(D2)
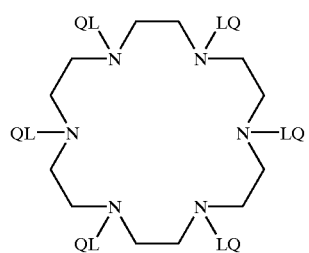
(D3)
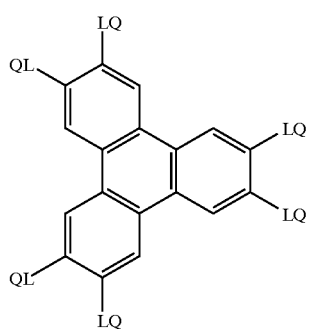
(D4)
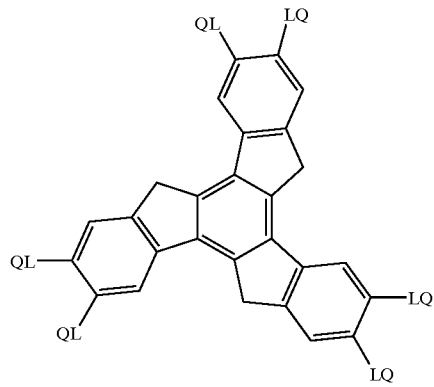
(D5)
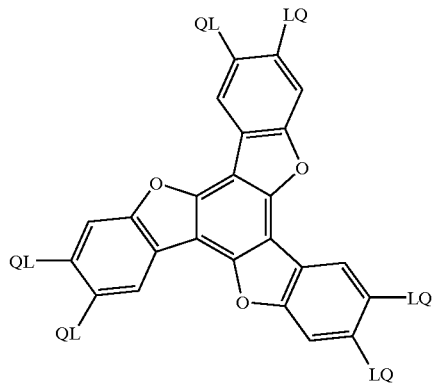
(D6)
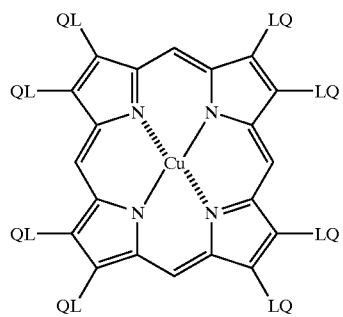
(D7)
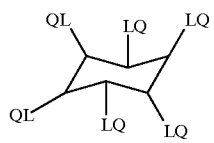
(D8)

-continued
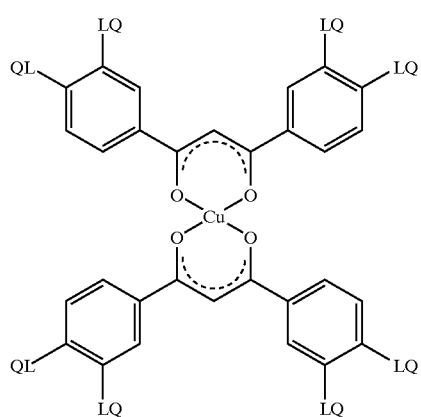
(D9)
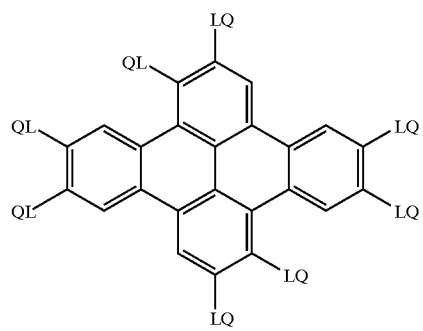
(D10)
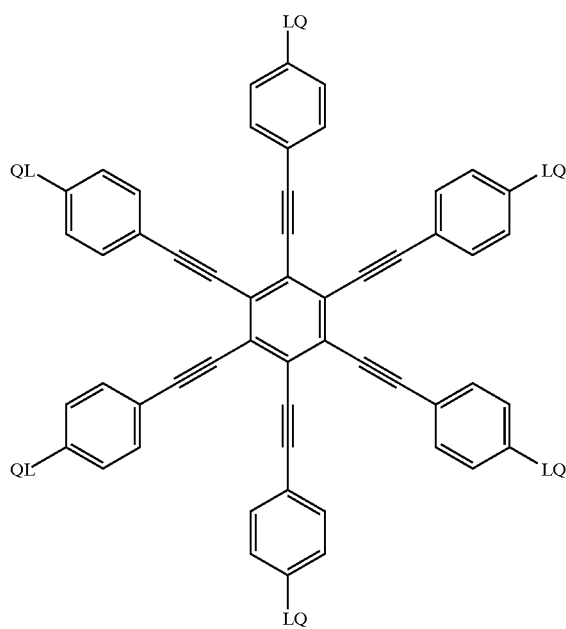
(D11)
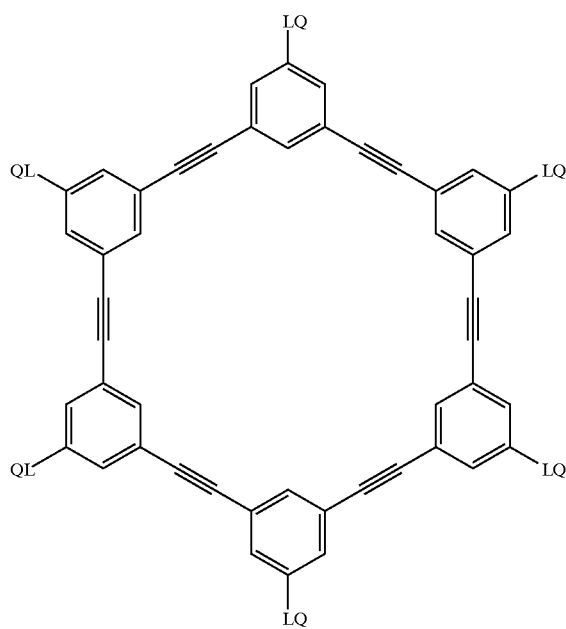
(D12)

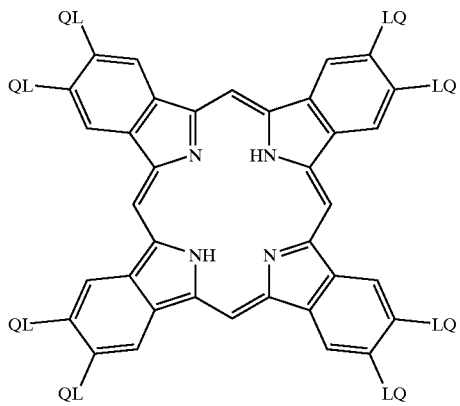
(D13)

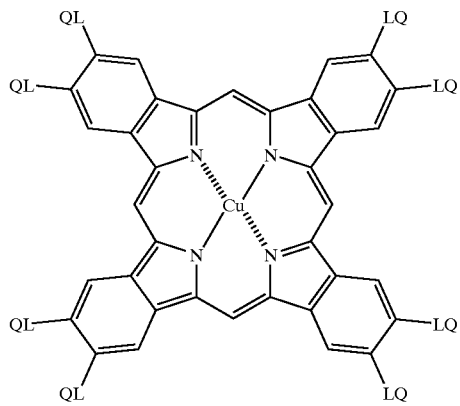
(D14)

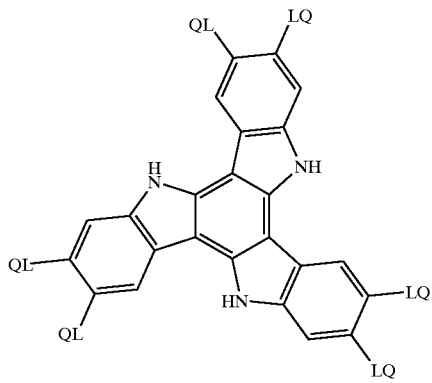
(D15)

In the formula, the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an alkenylene group, an arylene group, —CO—, —NH—, —O— and —S—. L further preferably is a divalent linking group comprising at least two divalent groups selected from the group consisting of an alkylene group, an alkenylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (Q). The AL means an alkylene group or an alkenylene group. The AR means an arylene group.

L1: —AL—CO—O—AL—
L2: —AL—CO—O—AL—O—
L3: —AL—CO—O—AL—O—AL—
L4: —AL—CO—O—AL—O—CO—
L5: —CO—AR—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—

The discotic liquid crystal molecules can be spirally twisted by introducing an asymmetric carbon atom into AL (an alkylene group or an alkenylene group). Examples of AL containing asymmetric carbon atoms (AL*) are shown below. In the examples, the left side is adjacent to the discotic core (D), and the right side is adjacent to the polymerizable group (Q). The carbon atom (C) with the mark (*) is the asymmetric carbon atom. The optical activity can be either S or R.

AL*1: —CH$_2$CH$_2$—C*HCH$_3$—CH$_2$CH$_2$CH$_2$—
AL*2: —CH$_2$CH$_2$CH$_2$—C*HCH$_3$—CH$_2$CH$_2$—
AL*3: —CH$_2$—C*HCH$_3$—CH$_2$CH$_2$CH$_2$CH$_2$—
AL*4: —C*HCH$_3$—CH$_2$CH$_2$CH$_2$CH$_2$CH$_2$—

AL*5: —CH₂CH₂CH₂CH₂—C*HCH₃—CH₂—
AL*6: —CH₂CH₂CH₂CH₂CH₂—C*HCH₃—
AL*7: —C*HCH₃—CH₂CH₂CH₂CH₂—
AL*8: —CH₂—C*HCH₃—CH₂CH₂CH₂—
AL*9: —CH₂CH₂—C*HCH₃—CH₂CH₂—
AL*10: —CH₂CH₂CH₂—C*HCH₃—CH₂—
AL*11: —CH₂CH₂CH₂CH₂—C*HCH₃—
AL*12: —C*HCH₃—CH₂CH₂CH₂—
AL*13: —CH₂—C*HCH₃—CH₂CH₂—
AL*14: —CH₂CH₂—C*HCH₃—CH₂—
AL*15: —CH₂CH₂CH₂—C*HCH₃—
AL*16: —CH₂—C*HCH₃—
AL*17: —C*HCH₃—CH₂—
AL*18: —C*HCH₃—CH₂CH₂CH₂CH₂CH₂CH₂—
AL*19: —CH₂—C*HCH₃—CH₂CH₂CH₂CH₂CH₂—
AL*20: —CH₂CH₂—C*HCH₃—CH₂CH₂CH₂CH₂—
AL*21: —CH₂CH₂CH₂—C*HCH₃—CH₂CH₂CH₂—
AL*22: —C*HCH₃—CH₂CH₂CH₂CH₂CH₂CH₂CH₂—
AL*23: —CH₂—C*HCH₃—CH₂CH₂CH₂CH₂CH₂CH₂
AL*24: —CH₂CH₂—C*HCH₃—CH₂CH₂CH₂CH₂CH₂—
AL*25: —CH₂CH₂CH₂—C*HCH₃—CH₂CH₂CH₂CH₂—
AL*26: —C*HCH₃—CH₂CH₂CH₂CH₂CH₂CH₂CH₂CH₂—
AL*27: —CH₂—C*HCH₃—CH₂CH₂CH₂CH₂CH₂CH₂CH₂CH₂
AL*28: —CH₂—C*HCH₂CH₃—
AL*29: —CH₂—C*HCH₂CH₃—CH₂—
AL*30: —CH₂—C*HCH₂CH₃—CH₂CH₂—
AL*31: —CH₂—C*HCH₂CH₃—CH₂CH₂CH₂—
AL*32: —CH₂—C*H(n-C₃H₇)—CH₂CH₂—
AL*33: —CH₂—C*H(n-C₃H₇)—CH₂CH₂CH₂CH₂—
AL*34: —CH₂—C*H(OCOCH₃)—CH₂CH₂—
AL*35: —CH₂—C*H(OCOCH₃)—CH₂CH₂CH₂CH the polymerization reaction. Examples of the polymerizable groups (Q) are shown below.

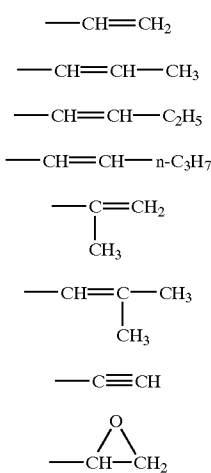

-continued

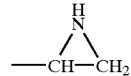
(Q9)

The polymerizable group (Q) preferably is an unsaturated polymerizable group (Q to Q7), an epoxy group (Q8) or an aziridinyl group (Q9), more preferably is an unsaturated polymerizable group, and most preferably is an ethylenically unsaturated group (Q1 to Q6).

In the formula, n is an integer of 4 to 12, which is determined according to the chemical structure of the discotic core (D). The 4 to 12 combinations of L and Q can be different from each other. However, the combinations are preferably identical.

Two or more kinds of the discotic liquid crystal molecules can be used in combination. For example, the molecules containing an asymmetric carbon atom in the divalent linking group (L) can be used in combination with those containing no asymmetric carbon atom. Further, the molecules having a polymerizable group (Q) can be used in combination with those having no polymerizable group (i.e., the molecules having a hydrogen atom in place of the polymerizable group (Q)). The liquid crystal molecules containing an asymmetric carbon atom and having no polymerizable group is particularly preferably used in combination with those having a polymerizable group and containing no asymmetric carbon atom.

In place of introducing an asymmetric carbon atom into the divalent linking group of the discotic liquid crystal molecule, the molecules can also be spirally twisted by adding an optical active compound containing an asymmetric carbon atom (chiral agent) into the optically anisotropic layer. Various natural or synthetic optical active compounds can be used as the chiral agent. The chiral agent can have a polymerizable group, which is the same as or similar to the polymerizable group of the discotic liquid crystal compound. The discotic liquid crystal molecules are fixed in the optically anisotropic layer by a polymerization reaction after the molecules are essentially vertically (homogeneously) aligned. The chiral agent having a polymerizable group can also be fixed by the same or a similar polymerization reaction.

[Cellulose Ester]

The optically anisotropic layer can further contain a cellulose ester, which has a function of uniformly and essentially vertically (homogeneously) orienting in mono domain alignment the discotic liquid crystal molecules placed near the interface between the layer and the air.

The cellulose ester preferably is a cellulose ester of a lower fatty acid.

The term "lower fatty acid" of the cellulose ester means a fatty acid having 1 to 6 carbon atoms. The lower fatty acid preferably has 2 to 5 carbon atoms, and more preferably has 2 to 4 carbon atoms. The fatty acid may have a substituent group (e.g., hydroxyl). Two or more fatty acids may form an ester with cellulose acetate. Examples of the cellulose esters of the lower fatty acids include cellulose acetate, cellulose propionate, cellulose butyrate, cellulose hydroxypropionate, cellulose acetate propionate and cellulose acetate butyrate. Cellulose acetate butyrate is particularly preferred. Butyric acid content of the cellulose acetate butyrate is preferably not less than 30%, more preferably in the range of 30 to 80%. Acetic acid content of the cellulose acetate butyrate is preferably less than 30%, and more preferably in the range of 1 to 30%.

The coating amount of the cellulose ester is preferably in the range of 0.005 to 0.5 g per m², more preferably in the range of 0.01 to 0.45 g per m², further preferably in the range of 0.02 to 0.4 g per m², and most preferably in the range of 0.03 to 0.35 g per m². The amount of the cellulose ester is also preferably in the range of 0.1 to 5 wt. % based on the amount of the discotic liquid crystal molecule.

[Alignment promoter]

Also with an alignment promoter having the formula (I), the discotic liquid crystal molecules placed near the interface between the layer and the air can be uniformly and essentially vertically (homogeneously) oriented in mono domain alignment.

$$(Hb—)_mL(—BU)_n \quad (I)$$

In the formula (I), Hb is a hydrophobic group selected from the group consisting of a fluorine-substituted alkyl group, a fluorine-substituted aryl group, an alkyl group having 6 or more carbon atoms and an alkyl-substituted oligosiloxanoxy group.

The fluorine-substituted alkyl group may have a cyclic or branched structure. The fluorine-substituted alkyl group preferably contains 1 to 40 carbon atoms, more preferably contains 2 to 30 carbon atoms, further preferably contains 3 to 20 carbon atoms, furthermore preferably contains 4 to 15 carbon atoms, and most preferably contains 6 to 12 carbon atoms. The ratio of fluorine atoms substituting hydrogen atoms of the alkyl group is preferably in the range of 50 to 100%, more preferably in the range of 60 to 100%, further preferably in the range of 70 to 100%, furthermore preferably in the range of 80 to 100%, and most preferably in the range of 85 to 100%.

The fluorine-substituted aryl group is preferably a fluorine-substituted phenyl. The ratio of fluorine atoms substituting hydrogen atoms of the aryl group is preferably in the range of 50 to 100%, more preferably 60 to 100%, further preferably 70 to 100%, furthermore preferably 80 to 100%, and most preferably 85 to 100%.

The alkyl group having 6 or more carbon atoms may have a cyclic or branched structure. The alkyl group preferably contains 6 to 60 carbon atoms, more preferably contains 7 to 50 carbon atoms, further preferably contains 8 to 40 carbon atoms, furthermore preferably contains 9 to 30 carbon atoms, and most preferably contains 10 to 20 carbon atoms.

The alkyl-substituted oligosiloxanoxy group can be represented by the following formula:

$$R^1—(SiR^2{}_2—O)_q—.$$

In the formula, $R^1$ is hydrogen, hydroxyl or an alkyl group; $R^2$ is hydrogen or an alkyl group, and at least one of the two groups represented by $R^2$ is an alkyl group; and q is an integer of 2 to 12. $R^1$ preferably is hydroxyl. Each of the two groups represented by $R^2$ preferably is an alkyl group. In the formula, q preferably is an integer of 2 to 8, and more preferably is an integer of 3 to 6. The alkyl group may have a cyclic or branched structure. The alkyl group preferably contains 1 to 12 carbon atoms, more preferably contains 1 to 8 carbon atoms, further preferably contains 1 to 6 carbon atoms, furthermore preferably contains 1 to 4 carbon atoms, and most preferably contains 1 or 2 carbon atoms.

Examples of the hydrophobic group (Hb) are shown below.

n-C$_8$F$_{17}$—  (Hb-1)

H—C$_8$F$_{16}$—  (Hb-2)

tetrafluorophenyl-  (Hb-3)

H—C$_6$F$_{12}$—  (Hb-4)

H—C$_4$F$_8$—  (Hb-5)

HO—(Si(CH$_3$)$_2$—O)$_4$—  (Hb-6)

n-C$_{12}$H$_{25}$—  (Hb-7)

In the formula (I), Bu is a bulky group showing an excluded volume effect and comprising at least two rings. Each ring may be an aliphatic, aromatic or hetero-cyclic ring, and is preferably a five-, six- or seven-membered (more preferably five- or six-membered, further preferably six-membered) ring. The rings may form a condensed ring, or be connected through a spiro bond, a single bond or a divalent linking group. Preferably, they form a condensed ring, or are connected through a single bond or a divalent linking group.

In the case that the rings form a condensed ring, they preferably form a tricyclic or tetracyclic condensed ring.

In the case that the rings are linked by a divalent linking group, examples of the linking group include —O—, —CO—, an alkylene group, vinylene bond (—CH=CH—), ethynylene bond (—C≡C—) and combinations thereof. The linking group is preferably vinylene bond or ethynylene bond, and more preferably ethynylene bond.

The ring can have a substituent group. Examples of the substituent groups include halogen atom, hydroxyl, cyano, nitro, an alkyl group (preferably containing 1 to 5 carbon atoms), a substituted alkyl group (e.g., carboxyalkyl group, alkoxyalkyl group), an alkoxy group, a substituted alkoxy group (e.g., oligoalkoxy group), an alkenyloxy group (e.g., vinyloxy), an acyl group (e.g., acryloyl, methacryloyl), an acyloxy group (e.g., acryloyloxy, benzoyloxy) and an epoxy group (e.g., epoxyethyl).

Examples of the bulky group (Bu) showing an excluded volume effect are shown below.

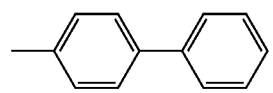

(Bu-1)

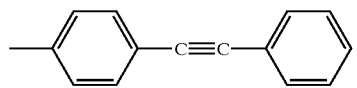

(Bu-2)

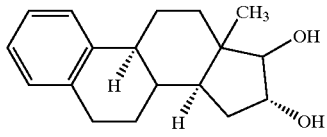

(Bu-3)

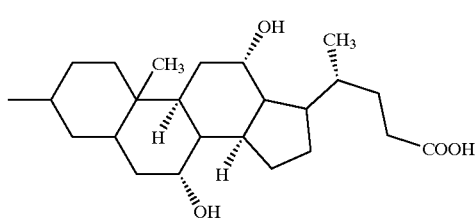

(Bu-4)

(Bu-5) 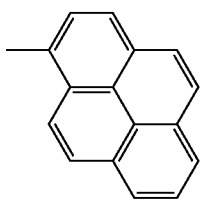

(Bu-6) 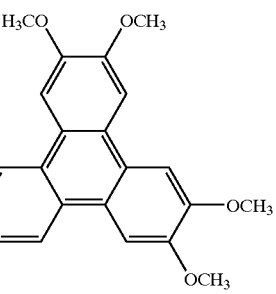

(Bu-7) 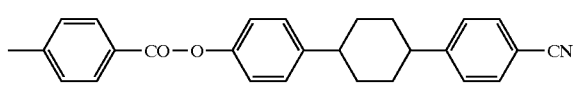

(Bu-8) 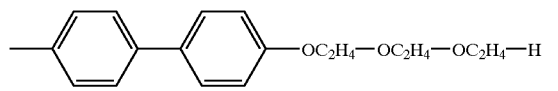

(Bu-9) 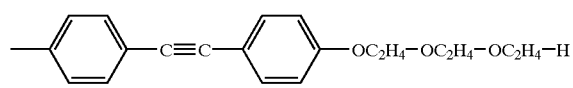

(Bu-10) 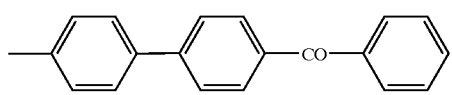

(Bu-11) 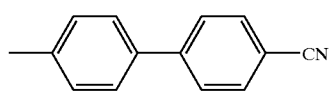

(Bu-12) 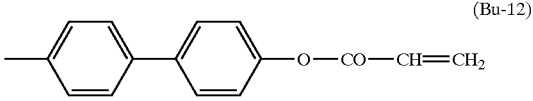

In the formula (I), L is an (m+n)-valent linking group.

In the formula (I), each of m and n is independently an integer of 1 to 12, preferably 1 to 8, more preferably 1 to 6, further preferably 1 to 4, furthermore preferably 1 to 3, and most preferably 1.

In the case that each of m and n is 1, L is preferably a divalent linking group selected from the group consisting of an alkylene group, —O—, —CO—, —NR—, —SO$_2$—, and the combination thereof (here R is a hydrogen or an alkyl group). Preferably, L contains at least one polar group (group other than -alkylene group-).

The above alkylene group preferably contains 1 to 40 (more preferably 1 to 30, further preferably 1 to 20, furthermore preferably 1 to 15, and most preferably 1 to 12) carbon atoms.

The above alkyl group preferably contains 1 to 40 (more preferably 1 to 30, further preferably 1 to 20, furthermore preferably 1 to 15, and most preferably 1 to 12) carbon atoms.

In the case that m is 2 or more, plural hydrophobic groups (Hb) may be different from each other.

In the case that n is 2 or more, plural bulky groups (Bu) may be different from each other.

If m or n is not less than 2, the linking group (L) may have a chain structure or a cyclic structure. In the case that the linking group (L) has a chain structure, the plural hydrophobic groups (Hb) or bulky groups (Bu) may connect to the main chain of the linking group (L) as side chains. In the case that the linking group (L) has a cyclic structure, the plural hydrophobic groups (Hb) or bulky groups (Bu) may connect to the ring of the linking group (L) as substituent groups.

Examples of the linking group (L) are shown below. In each example of divalent linking groups (L-1 to L-11), the left side is adjacent to the hydrophobic group (Hb), and the right side is adjacent to the bulky group (Bu). In each example of polyvalent linking groups (L-12 to L-16), the hydrophobic group (Hb) and the bulky group (Bu) are shown.

(L-1) —SO$_2$—N(n-C$_3$H$_7$)—C$_2$H$_4$—O—CO—O—
(L-2) —SO$_2$—N(n-C$_3$H$_7$)—C$_2$H$_4$—O—CO—NH—
(L-3) —SO$_2$—N(n-C$_3$H$_7$)—C$_2$H$_4$—O—CO—O—CH$_2$—
(L-4) —SO$_2$—NH—C$_2$H$_4$—O—CO—NH—
(L-5) —SO$_2$—NH—C$_2$H$_4$—O—CO—O—
(L-6) —CO—NH—C$_2$H$_4$—O—CO—O—
(L-7) —CO—NH—
(L-8) —NH—C$_2$H$_4$—O—CO—O—
(L-9) —CO—NH—C$_2$H$_4$—O—CO—NH—
(L-10) —SO$_2$—N(n-C$_3$H$_7$)—C$_6$H$_{12}$—O—CO—NH—
(L-11) —C$_2$H$_4$—O—CO—O—

(L-12)
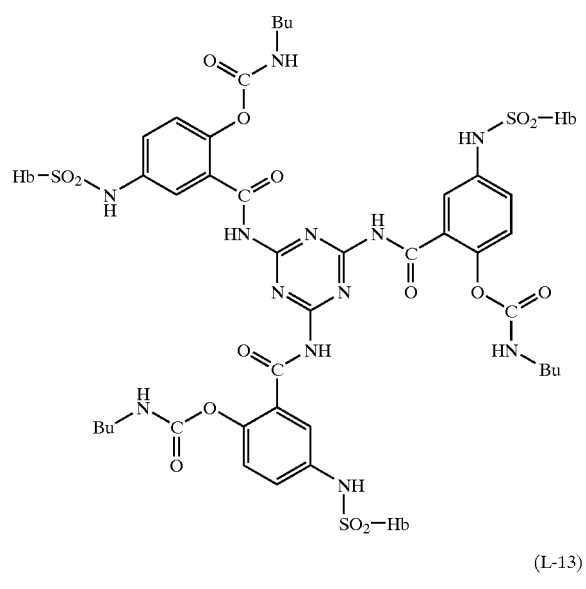

(L-13)
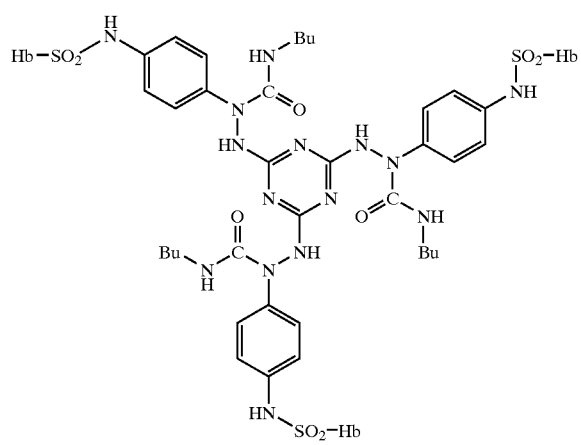

(L-14)
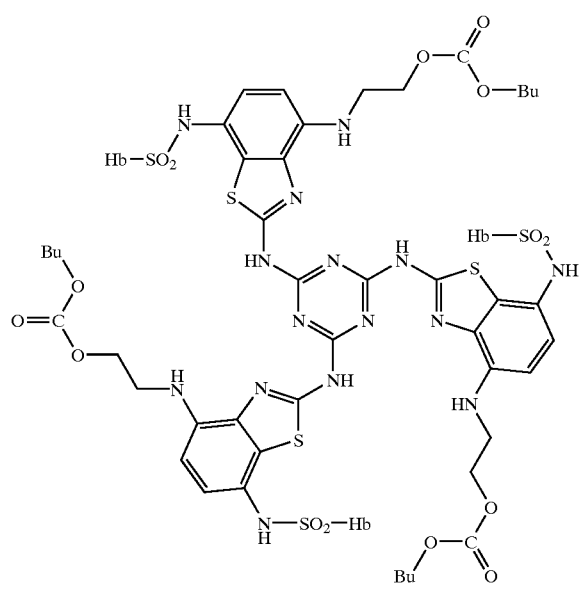

(L-15)
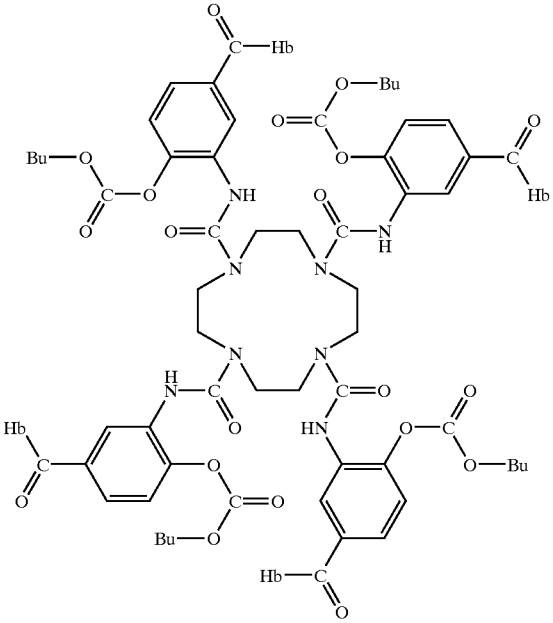

(L-16)
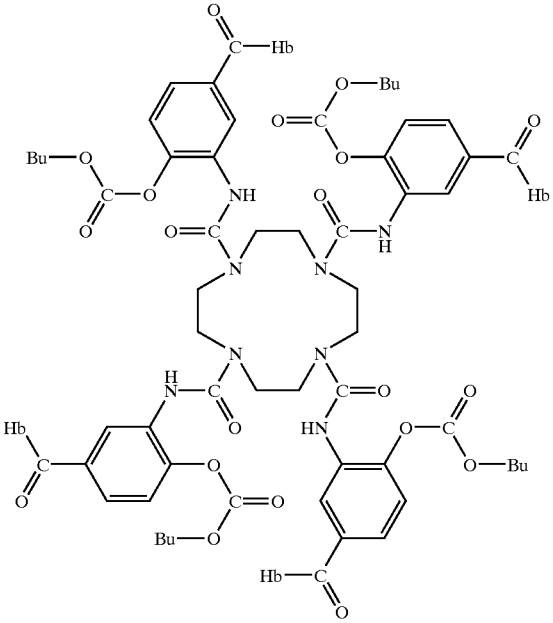

The alignment promoter is a compound consisting of the aforementioned hydrophobic group (Hb), the bulky group (Bu) showing an excluded volume effect and the linking group (L). There is no specific limitation on the combination thereof. Examples of the alignment promoters are shown below. In the following examples, numbers added to Hb-, Bu- or L- indicate the examples shown above with those numbers.

I-1: (Hb-1)-(L-1)-(Bu-1)
I-2: (Hb-1)-(L-2)-(Bu-2)
I-3: (Hb-1)-(L-1)-(Bu-3)
I-4: (Hb-1)-(L-1)-(Bu-4)
I-5: (Hb-1)-(L-3)-(Bu-5)
I-6: (Hb-1)-(L-1)-(Bu-6)
I-7: (Hb-1)-(L-1)-(Bu-7)
I-8: (Hb-1)-(L-3)-(Bu-1)
I-9: (Hb-1)-(L-4)-(Bu-2)
I-10: (Hb-1)-(L-5)-(Bu-8)
I-11: (Hb-1)-(L-2)-(Bu-9)
I-12: (Hb-1)-(L-5)-(Bu-10)
I-13: (Hb-1)-(L-6)-(Bu-11)
I-14: (Hb-2)-(L-7)-(Bu-7)

I-15: (Hb-3)-(L-8)-(Bu-1)
I-16: (Hb-4)-(L-9)-(Bu-2)
I-17: (Hb-5)-(L-6)-(Bu-8)
I-18: (Hb-1)-(L-10)-(Bu-9)
I-19: (Hb-1)-(L-5)-(Bu-12)
I-20: (Hb-6)-(L-11)-(Bu-12)
I-21: (Hb-7)-(L-7)-(Bu-7)
I-22: (Hb-1)$_3$-(L-12)-(BU-2)$_3$
I-23: (Hb-1)$_3$-(L-13)-(Bu-2)$_3$
I-24: (Hb-1)$_3$-(L-14)-(Bu-1)$_3$
I-25: (Hb-1)$_4$-(L-15)-(BU-1)$_4$
I-26: (Hb-1)$_4$-(L-16)-(Bu-2)$_4$

Two or more alignment promoters may be used in combination. The amount of the alignment promoter is in the range of 0.005 to 0.5 g/m$^2$, preferably 0.01 to 0.45 g/m$^2$, more preferably 0.02 to 0.4 g/m$^2$, and most preferably 0.03 to 0.35 g/m$^2$. Further, the alignment promoter is preferably used in an amount of 0.01 to 20 wt. %, and more preferably used in an amount of 0.1 to 5 wt. % based on the amount of the discotic liquid crystal molecules.

[Formation of Optically Anisotropic Layer]

An optically anisotropic layer can be formed by coating an orientation layer with a solution containing the discotic liquid crystal molecule and optional components such as the above-mentioned components (cellulose ester, alignment promoter, compound comprising an asymmetric carbon atom), a polymerization initiator (described below), and other additives.

A solvent for the preparation of the solution preferably is an organic solvent. Examples of the organic solvents include amides (e.g., dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The solution can be coated according to a conventional coating method such as an extrusion coating method, a direct gravure coating method, a reverse gravure coating method, a die coating method or a bar coating method.

The optically anisotropic layer has a thickness preferably in the range of 0.1 to 50 μm, more preferably 1 to 30 μm. and most preferably in the range of 5 to 20 μm. In the case that two optical compensatory sheets are used in a liquid crystal display, the preferred thickness of the layer is half of the preferred thickness in the case that one optical compensatory sheet is used.

The discotic liquid crystal molecules in the optically anisotropic layer are aligned at an average inclined angle in the range of 50° to 90°. The inclined angle is preferably uniform. However, the inclined angle can be continuously changed along the thickness of the optical anisotropic layer.

The twist angle of the discotic liquid crystal molecules is preferably similar to a twist angle of a liquid crystal cell of an STN mode, which is usually in the range of 180° to 360°, and preferably in the range of 180° to 270°. The difference between the twist angles is preferably not larger than 10°. In the case that one optical compensatory sheet is used in a liquid crystal display, the twist angle of the discotic liquid crystal molecules is preferably in the range of 180° to 360°. In the case that two optical compensatory sheets are used in a liquid crystal display, the twist angle of the discotic liquid crystal molecules is preferably in the range of 90° to 180°.

In a liquid crystal display of an STN mode, a wavelength dependency of the birefringence ($\Delta n(\lambda)$) of an optically anisotropic layer is preferably similar to a wavelength dependency of the birefringence of a liquid crystal cell of an STN mode.

The formed optically anisotropic layer is heated so that the discotic liquid crystal molecules may be arranged essentially in mono domain alignment at an average inclined angle in the range of 50° to 90°. The temperature in this heating process preferably satisfies the following formula (T1):

$$T_{NI}-0.5\times(T_{NI}-T_{CN})\leq T<T_{NI} \tag{T1}$$

In the formula, T is the temperature (°C) in the heating process; $T_{NI}$ is the nematic-isotropic transition temperature (°C) of the discotic liquid crystal molecules, and $T_{CN}$ is the crystal-nematic transition temperature (°C) of the discotic liquid crystal molecules. In the case that a columnar phase appears, $T_{CN}$ is the crystal-columnar phase transition temperature (°C).

It is more preferred for the temperature (T) to satisfy the following formula (T2), and further preferably it satisfies the following formula (T3).

$$T_{NI}-0.3\times(T_{NI}-T_{CN})\leq T<T_{NI} \tag{T2}$$

$$T_{NI}-0.2\times(T_{NI}-T_{CN})\leq T<T_{NI} \tag{T3}$$

The nematic-isotropic transition temperature ($T_{NI}$) and the crystal-nematic transition temperature ($T_{CN}$) depend on not only the used discotic liquid crystal molecules but also the other components of the optically anisotropic layer. Accordingly, before forming the optically anisotropic layer, the transition temperatures must be determined by a preliminary experiment with another optically anisotropic layer comprising the same components as the aimed layer. The layer for the preliminary experiment is heated and observed with a polarizing microscope to determine the transition temperatures.

The optically anisotropic layer can be heated by various means.

The time for heating is determined so that the discotic liquid crystal molecules may be arranged essentially in mono domain alignment, and is generally in the range of 10 seconds to 60 minutes.

For controlling the transition temperatures of the discotic liquid crystal molecules, additives may be used. If the nematic-isotropic transition temperature ($T_{NI}$) is set low, the heating process can be carried out at a relatively low temperature. Compounds preferably used as the additives are compatible with the liquid crystal molecules, and does not affect the alignment of the molecules. For example, if a monomer having a polymerizable group (e.g., vinyl, vinyloxy, acryloyl, methacryloyl) is added to the discotic liquid crystal molecules, the nematic-isotropic transition temperature ($T_{NI}$) is lowered. The amount of the additives is preferably in the range of 1 to 50 wt. %, more preferably 5 to 30 wt. % based on the amount of the liquid crystal molecules.

The aligned discotic liquid crystal molecules are preferably fixed while the essentially vertical (homogeneous) alignment is maintained. The discotic liquid crystal molecules are fixed preferably by a polymerization reaction of the polymerizable groups (Q) in the molecules. The polymerization reaction can be classified into a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with an ultraviolet ray.

The exposure energy is preferably in the range of 20 to 50,000 mJ per $cm^2$, and more preferably in the range of 100 to 800 mJ per $cm^2$. The light irradiation can be conducted while the layer is heated to accelerate the photo polymerization reaction.

[Liquid Crystal Display]

The optical compensatory sheet of the invention is particularly effective in a liquid crystal display of an STN mode.

The liquid crystal display of an STN mode comprises a liquid crystal cell of an STN mode, a pair of optical compensatory sheets arranged on both sides of the cell or one optical compensatory sheet arranged on one side of the cell, and a pair of polarizing elements arranged on both sides.

The alignment of rod-like liquid crystal molecules in the liquid crystal cell and that of the discotic liquid crystal molecules in the optical compensatory sheet is preferably so adjusted that a director of rod-like liquid crystal molecules adjacent to the optical compensatory sheet may be the essentially same direction of a director of the discotic liquid crystal molecules adjacent to the liquid crystal cell. The director of the rod-like liquid crystal molecules means the direction of the long axis of the rod-like molecules. The director of the discotic liquid crystal molecules means the direction of a normal line of the discotic core plane. The essentially same direction means that the difference of the angle between the directors viewed along a normal line of the liquid crystal cell is in the range of ±10°.

The transparent substrate of the optical compensatory sheet can be used as a protective film of a polarizing plate (on the side facing the liquid crystal cell). In this case, a slow axis (direction showing the maximum refractive index) of the transparent substrate is preferably so arranged that the slow axis may be essentially perpendicular or parallel to the transmission axis (direction showing the maximum transmittance) of the polarizing plate. The term "essentially perpendicular or parallel" means that a margin for error based on the exact angle is in the range of ±10°.

EXAMPLE 1
(Production of Optical Compensatory Sheet A)

A triacetyl cellulose film (thickness: 100 μm, Fuji Tac, Fuji Photo Film Co., Ltd.) was used as a transparent substrate.

The polyimide shown below was dissolved in a mixed solvent of N-methyl-2-pyrrolidone, butoxyethanol and methyl ethyl ketone in the amount of 4 wt. %. The prepared solution was applied on the transparent substrate by means of a bar coater of #3. After drying at 140° C. for 2 minutes, the applied layer was further heated at 62° C. for 5 minutes to form an orientation layer of 0.51 μm thickness.

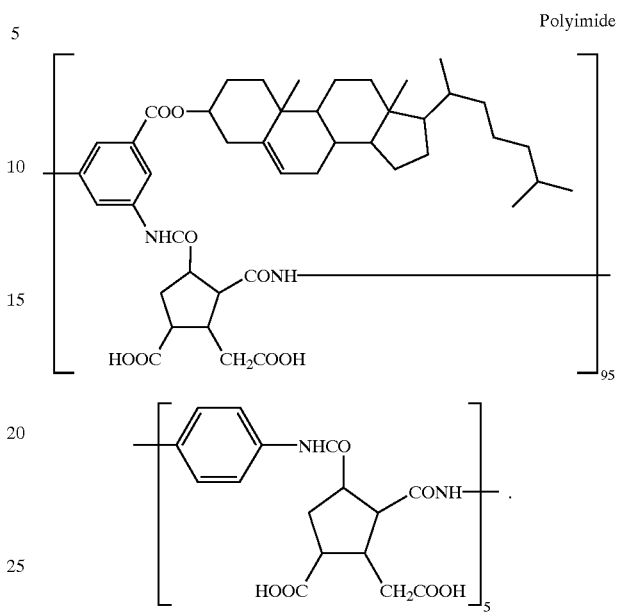

The surface of the orientation layer was subjected to a rubbing treatment, and was coated with the coating solution having the following components by means of a bar coater of #9. After the coating layer applied on the surface was then heated at 130° C. for 10 minutes, discotic liquid crystal molecules were aligned. The two cellulose acetate butyrates (CAB-551-0.2 and CAB-531-1) in the following components were applied in the total amount of 0.034 $g/m^2$.

| Coating solution for optically anisotropic layer | |
|---|---|
| The following discotic liquid crystal molecule (1) | 91 weight parts |
| The following chiral agent | 1.6 weight parts |
| Cellulose acetate butyrate (CAB-551-0.2, Eastman Chemical; acetylation degree: 2.0%; butyrylation degree: 52.0%; number average molecular weight: 30,000) | 0.25 weight part |
| Cellulose acetate butyrate (CAB-531-1, Eastman Chemical; acetylation degree: 3.0%; butyrylation degree: 50.0%; number average molecular weight: 40,000) | 0.25 weight part |
| Ethylene oxide denatured trimethlolpropane-triacrylate (V#360, Osaka Organic Chemicals Co., Ltd.) | 9 weight parts |
| A photopolymerization initiator (Irgacure 907, Ciba-Geigy) | 3 weight parts |
| A sensitizer (Kayacure DETX, Nippon Kayaku Co., Ltd.) | 1 weight part |
| Methyl ethyl ketone | 120 weight parts |

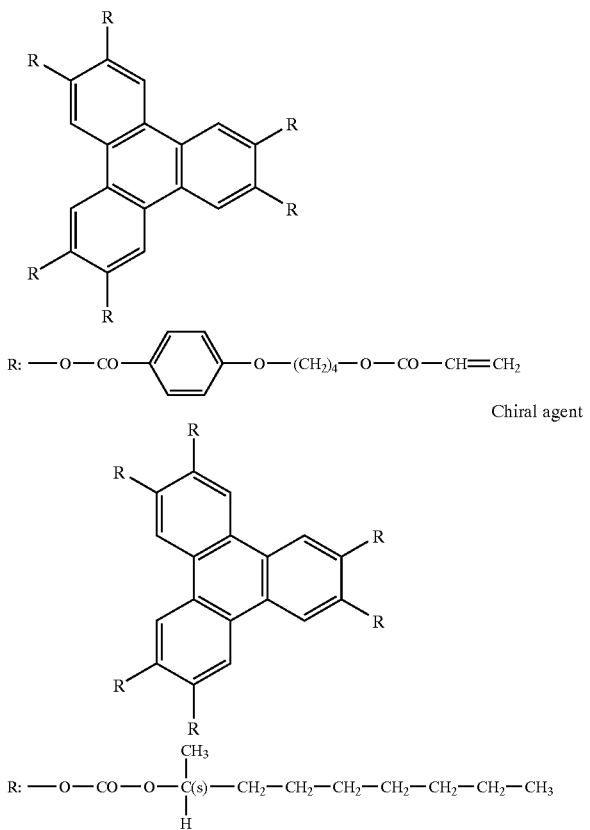

Discotic liquid crystal molecule (1)

Chiral agent

The coated layer was exposed to ultraviolet light of a metal halide lamp in the amount of 500 mJ/cm² while heated at 130° C., to polymerize the terminal vinyl group of the discotic liquid crystal molecule (1) and to fix the alignment. Thus an optical compensatory sheet was produced. In the optically anisotropic layer, the discotic liquid crystal molecules are twisted; and are essentially vertically (homogeneously) aligned.

The Δnd of the produced optical compensatory sheet was measured at 550 nm, and found 440 nm. The twist angle of the discotic liquid crystal molecules was 120°. Further, the alignment of the discotic liquid crystal molecules was observed by means of a polarizing microscope, and thereby it was confirmed that all the molecules were uniformly oriented in mono domain alignment.

EXAMPLE 2
(Production of Optical Compensatory Sheet B)

The procedure of Example 1 was repeated except that the amount of each cellulose acetate butyrate was changed into 1 weight part (total applied amount: 0.136 g/m²), to produce an optical compensatory sheet.

The Δnd of the produced optical compensatory sheet was measured to find 440 nm. The twist angle of the discotic liquid crystal molecules was 120°. Further, the alignment of the discotic liquid crystal molecules was observed by means of a polarizing microscope, and thereby it was confirmed that all the molecules were uniformly oriented in mono domain alignment.

EXAMPLE 3
(Production of Optical Compensatory Sheet C)

The procedure of Example 1 was repeated except that only the cellulose acetate butyrate of CAB-551-0.2 (Eastman Chemical; acetylation degree: 2.0%; butyrylation degree: 52.0%; number average molecular weight: 30,000) was used in the amount of 0.5 weight part (applied amount: 0.034 g/m²), to produce an optical compensatory sheet.

The Δnd of the produced optical compensatory sheet was measured to find 440 nm. The twist angle of the discotic liquid crystal molecules was 120°. Further, the alignment of the discotic liquid crystal molecules was observed by means of a polarizing microscope, and thereby it was confirmed that all the molecules were uniformly oriented in mono domain alignment.

EXAMPLE 4
(Production of Optical Compensatory Sheet D)

The procedure of Example 1 was repeated except that only the cellulose acetate butyrate of CAB-551-0.2 (Eastman Chemical; acetylation degree: 2.0%; butyrylation degree: 52.0%; number average molecular weight: 30,000) was used in the amount of 0.25 weight part to prepare the coating solution and that the thus prepared coating solution was applied by means of a bar coater of #18 (applied amount of the cellulose acetate butyrate: 0.034 g/m²), to produce an optical compensatory sheet.

The Δnd of the produced optical compensatory sheet was measured to find 880 nm. The twist angle of the discotic liquid crystal molecules was 240°. Further, the alignment of the discotic liquid crystal molecules was observed by means of a polarizing microscope, and thereby it was confirmed that all the molecules were uniformly oriented in mono domain alignment.

EXAMPLE 5
(Production of Optical Compensatory Sheet E)

The procedure of Example 1 was repeated except that the amount of each cellulose acetate butyrate was changed into 0.125 weight part to prepare the coating solution and that the thus prepared coating solution was applied by means of a bar coater of #18 (total applied amount of the cellulose acetate butyrates: 0.034 g/m²), to produce an optical compensatory sheet.

The Δnd of the produced optical compensatory sheet was measured to find 880 nm. The twist angle of the discotic liquid crystal molecules was 240°. Further, the alignment of the discotic liquid crystal molecules was observed by means of a polarizing microscope, and thereby it was confirmed that all the molecules were uniformly oriented in mono domain alignment.

EXAMPLE 6
(Production of Optical Compensatory Sheet F)

The procedure of Example 1 was repeated except that only the cellulose acetate butyrate of CAB-551-0.2 (Eastman Chemical; acetylation degree: 2.0%; butyrylation degree: 52.0%; number average molecular weight: 30,000) was used in the amount of 2.5 weight parts to prepare the coating solution and that the thus prepared coating solution was applied by means of a bar coater of #18 (applied amount of the cellulose acetate butyrate: 0.34 g/m²), to produce an optical compensatory sheet.

The Δnd of the produced optical compensatory sheet was measured to find 880 nm. The twist angle of the discotic liquid crystal molecules was 240°. Further, the alignment of the discotic liquid crystal molecules was observed by means of a polarizing microscope, and thereby it was confirmed that all the molecules were uniformly oriented in mono domain alignment.

COMPARISON EXAMPLE 1
(Production of Optical Compensatory Sheet X)

The procedure of Example 1 was repeated except that the amount of each cellulose acetate butyrate was changed into 4 weight parts to prepare the coating solution and that the thus prepared coating solution was applied by means of a bar coater of #18 (total applied amount of the cellulose acetate butyrates: 0.544 g/m$^2$), to produce an optical compensatory sheet.

The $\Delta$nd of the produced optical compensatory sheet was measured to find 880 nm. The twist angle of the discotic liquid crystal molecules was 240°. Further, the alignment of the discotic liquid crystal molecules was observed by means of a polarizing microscope, to find schlieren patterns were seen. This indicated that the molecules were not uniformly oriented in mono domain alignment.

COMPARISON EXAMPLE 2
(Production of Optical Compensatory Sheet Y)

The procedure of Example 1 was repeated except that the cellulose acetate butyrates were not used to prepare the coating solution and that the thus prepared coating solution was applied by means of a bar coater of #18, to produce an optical compensatory sheet.

The $\Delta$nd of the produced optical compensatory sheet was measured to find 880 nm. The twist angle of the discotic liquid crystal molecules was 240°. Further, the alignment of the discotic liquid crystal molecules was observed by means of a polarizing microscope, to find two aligning patterns having the same And and the same twist angle but different tilt angles. This indicated that the molecules were arranged not in mono domain alignment but in dual domain alignment.

EXAMPLE 7
(Production of Liquid Crystal Display)

An STN liquid crystal cell (twist angle: 240°, $\Delta$nd: 880 nm) was prepared. Independently, two optical compensatory sheets A produced in Example 1 were laminated so that their optically anisotropic layer sides might face each other and that the director (direction of a normal line of the discotic core plane) of the discotic liquid crystal molecules in one sheet might be identical with that of the liquid crystal molecules in the other sheet. The thus laminated optical compensatory sheets were provided on the bottom of the STN liquid crystal cell, so that the director of the discotic liquid crystal molecules in the sheets might be arranged at the same direction of the director of the rod-like liquid crystal molecules in the cell along the interface between the cell and the sheets. A pair of polarizing plates were then provided according to crossed Nicols arrangement, to produce a liquid crystal display of an STN mode.

With respect to the produced liquid crystal display, the contrast ratio was measured by means of a measuring device (EZ-Contrast 160D, ELDIM). The result was shown in Table 1.

EXAMPLE 8
(Production of Liquid Crystal Display)

An STN liquid crystal cell (twist angle: 240°, $\Delta$nd: 880 nm) was prepared. Independently, two optical compensatory sheets A produced in Example 1 were prepared. On each of the top and the bottom of the cell, each of the optical compensatory sheets was provided so that the optically anisotropic layer side might face the cell and that the director (direction of a normal line of the discotic core plane) of the discotic liquid crystal molecules in one sheet might be identical with that of the liquid crystal molecules in the other sheet. A pair of polarizing plates were then provided according to crossed Nicols arrangement, to produce a liquid crystal display of an STN mode.

With respect to the produced liquid crystal display, the contrast ratio was measured by means of a measuring device (EZ-Contrast 160D, ELDIM). The result was shown in Table 1.

EXAMPLE 9
(Production of Liquid Crystal Display)

An STN liquid crystal cell (twist angle: 240°, $\Delta$nd: 880 nm) was prepared. Independently, two optical compensatory sheets B produced in Example 2 were laminated so that their optically anisotropic layer sides might face each other and that the director (direction of a normal line of the discotic core plane) of the discotic liquid crystal molecules in one sheet might be identical with that of the liquid crystal molecules in the other sheet. The thus laminated optical compensatory sheets were provided on the bottom of the STN liquid crystal cell, so that the director of the discotic liquid crystal molecules in the sheets might be arranged at the same direction of the director of the rod-like liquid crystal molecules in the cell along the interface between the cell and the sheets. A pair of polarizing plates were then provided according to crossed Nicols arrangement, to produce a liquid crystal display of an STN mode.

With respect to the produced liquid crystal display, the contrast ratio was measured by means of a measuring device (EZ-Contrast 160D, ELDIM). The result was shown in Table 1.

EXAMPLE 10
(Production of Liquid Crystal Display)

An STN liquid crystal cell (twist angle: 240°, $\Delta$nd: 880 nm) was prepared. Independently, two optical compensatory sheets C produced in Example 3 were laminated so that their optically anisotropic layer sides might face each other and that the director (direction of a normal line of the discotic core plane) of the discotic liquid crystal molecules in one sheet might be identical with that of the liquid crystal molecules in the other sheet. The thus laminated optical compensatory sheets were provided on the bottom of the STN liquid crystal cell, so that the director of the discotic liquid crystal molecules in the sheets might be arranged at the same direction of the director of the rod-like liquid crystal molecules in the cell along the interface between the cell and the sheets. A pair of polarizing plates were then provided according to crossed Nicols arrangement, to produce a liquid crystal display of an STN mode.

With respect to the produced liquid crystal display, the contrast ratio was measured by means of a measuring device (EZ-Contrast 160D, ELDIM). The result was shown in Table 1.

EXAMPLE 11
(Production of Liquid Crystal Display)

An STN liquid crystal cell (twist angle: 240°, $\Delta$nd: 880 nm) was prepared. On the bottom of the cell, an optical compensatory sheet D produced in Example 4 was provided so that the optically anisotropic layer side might face the cell and that the director of the discotic liquid crystal molecules in the sheet might be arranged at the same direction of the director of the rod-like liquid crystal molecules in the cell along the interface between the cell and the sheet. A pair of polarizing plates were then provided according to crossed Nicols arrangement, to produce a liquid crystal display of an STN mode.

With respect to the produced liquid crystal display, the contrast ratio was measured by means of a measuring device (EZ-Contrast 160D, ELDIM). The result was shown in Table 1.

EXAMPLE 12
(Production of Liquid Crystal Display)

An STN liquid crystal cell (twist angle: 240°, Δnd: 880 nm) was prepared. On the bottom of the cell, an optical compensatory sheet E produced in Example 5 was provided so that the optically anisotropic layer side might face the cell and that the director of the discotic liquid crystal molecules in the sheet might be arranged at the same direction of the director of the rod-like liquid crystal molecules in the cell along the interface between the cell and the sheet. A pair of polarizing plates were then provided according to crossed Nicols arrangement, to produce a liquid crystal display of an STN mode.

With respect to the produced liquid crystal display, the contrast ratio was measured by means of a measuring device (EZ-Contrast 160D, ELDIM). The result was shown in Table 1.

EXAMPLE 13
(Production of Liquid Crystal Display)

An STN liquid crystal cell (twist angle: 240°, Δnd: 880 nm) was prepared. On the bottom of the cell, an optical compensatory sheet F produced in Example 6 was provided so that the optically anisotropic layer side might face the cell and that the director of the discotic liquid crystal molecules in the sheet might be arranged at the same direction of the director of the rod-like liquid crystal molecules in the cell along the interface between the cell and the sheet. A pair of polarizing plates were then provided according to crossed Nicols arrangement, to produce a liquid crystal display of an STN mode.

With respect to the produced liquid crystal display, the contrast ratio was measured by means of a measuring device (EZ-Contrast 160D, ELDIM). The result was shown in Table 1.

COMPARISON EXAMPLE 3
(Production of Liquid Crystal Display)

An STN liquid crystal cell (twist angle: 240°, Δnd: 880 nm) was prepared. On the bottom of the cell, an optical compensatory sheet X produced in Comparison Example 1 was provided so that the optically anisotropic layer side might face the cell and that the director of the discotic liquid crystal molecules in the sheet might be arranged at the same direction of the director of the rod-like liquid crystal molecules in the cell along the interface between the cell and the sheet. A pair of polarizing plates were then provided according to crossed Nicols arrangement, to produce a liquid crystal display of an STN mode.

With respect to the produced liquid crystal display, the contrast ratio was measured by means of a measuring device (EZ-Contrast 160D, ELDIM). The result was shown in Table 1.

COMPARISON EXAMPLE 4
(Production of Liquid Crystal Display)

An STN liquid crystal cell (twist angle: 240°, Δnd: 880 nm) was prepared. On the bottom of the cell, an optical compensatory sheet Y produced in Comparison Example 2 was provided so that the optically anisotropic layer side might face the cell and that the director of the discotic liquid crystal molecules in the sheet might be arranged at the same direction of the director of the rod-like liquid crystal molecules in the cell along the interface between the cell and the sheet. A pair of polarizing plates were then provided according to crossed Nicols arrangement, to produce a liquid crystal display of an STN mode.

With respect to the produced liquid crystal display, the contrast ratio was measured by means of a measuring device (EZ-Contrast 160D, ELDIM). The results are shown in Table 1.

TABLE 1

| Sheet | | Arrangement of sheet | Amount of Cellulose ester | Contrast Ratio |
|---|---|---|---|---|
| Ex. 7 | A | two on the bottom | 0.034 g/m$^2$ | 18 |
| Ex. 8 | A | one on the top and one on the bottom | 0.034 g/m$^2$ | 18 |
| Ex. 9 | B | two on the bottom | 0.136 g/m$^2$ | 19 |
| Ex. 10 | C | two on the bottom | 0.034 g/m$^2$ | 19 |
| Ex. 11 | D | one on the bottom | 0.034 g/m$^2$ | 20 |
| Ex. 12 | E | one on the bottom | 0.034 g/m$^2$ | 21 |
| Ex. 13 | F | one on the bottom | 0.34 g/m$^2$ | 19 |
| C. Ex. 3 | X | one on the bottom | 0.544 g/m$^2$ | 3 |
| C. Ex. 4 | Y | one on the bottom | 0 g/m$^2$ | 5 |

EXAMPLE 14
(Production of Optical Compensatory Sheet A1)

A triacetyl cellulose film (thickness: 100 μm, Fuji Tac, Fuji Photo Film Co., Ltd.) was used as a transparent substrate.

The polyimide of Example 1 was dissolved in a mixed solvent of N-methyl-2-pyrrolidone, butoxyethanol and methyl ethyl ketone in the amount of 4 wt. %. The prepared solution was applied on the transparent substrate by means of a bar coater of #3. After drying at 140° C. for 2 minutes, the applied layer was further heated at 62° C. for 5 minutes to form an orientation layer of 0.51 μm thickness.

The surface of the orientation layer was subjected to a rubbing treatment, and was coated with the coating solution having the following components by means of a bar coater of #9.

| Coating solution for optically anisotropic layer | |
|---|---|
| The discotic liquid crystal compound (1) used in Example 1 | 91 weight parts |
| The chiral agent used in Example 1 | 1.6 weight parts |
| Cellulose acetate butyrate (CAB-551-0.2, Eastman Chemical; acetylation degree: 2.0%; butyrylation degree: 52.0%; number average molecular weight: 30,000) | 0.25 weight part |
| Cellulose acetate butyrate (CAB-531-1, Eastman Chemical; acetylation degree: 3.0%; butyrylation degree: 50.0%; number average molecular weight: 40,000) | 0.25 weight part |
| Ethylene oxide denatured trimethlolpropane-triacrylate (V#360, Osaka Organic Chemicals Co., Ltd.) | 7 weight parts |
| A photopolymerization initiator (Irgacure 907, Ciba-Geigy) | 3 weight parts |
| A sensitizer (Kayacure DETX, Nippon Kayaku Co., Ltd.) | 1 weight part |
| Methyl ethyl ketone | 120 weight parts |

The produced optically anisotropic layer was heated and observed with a polarizing microscope. As the result, columnar phase was not observed, and the nematic-isotropic transition temperature ($T_{NI}$) and the crystal-nematic transition temperature ($T_{CN}$) of the discotic liquid crystal molecules were found to be 149° C. and 105° C., respectively.

Freshly, the produced optically anisotropic layer was heated at 140° C. for 10 minutes to align the discotic liquid crystal molecules.

The coated layer was exposed to ultraviolet light of a metal halide lamp in the amount of 500 mJ/cm$^2$ while heated at 140° C., to polymerize the terminal vinyl group of the discotic liquid crystal molecule (1) and to fix the alignment.

Thus an optical compensatory sheet was produced. In the optically anisotropic layer, the discotic liquid crystal molecules are twisted, and are essentially vertically (homogeneously) aligned.

The Δnd of the produced optical compensatory sheet was measured at 550 nm, and found 440 nm. The twist angle of the discotic liquid crystal molecules was 120°. Further, the alignment of the discotic liquid crystal molecules was observed by means of a polarizing microscope, and thereby it was confirmed that all the molecules were uniformly oriented in mono domain alignment.

COMPARISON EXAMPLE 5
(Production of Optical Compensatory Sheet A2)

The procedure of Example 14 was repeated except that the temperature for heating the optical compensatory sheet was changed into 110° C., to produce an optical compensatory sheet A2.

The Δnd of the produced optical compensatory sheet was measured to find 440 nm. The twist angle of the discotic liquid crystal molecules was 120°. Further, the alignment of the discotic liquid crystal molecules was observed by means of a polarizing microscope, to find two aligning patterns having the same Δnd and the same twist angle but different tilt angles. This indicated that the molecules were arranged not in mono domain alignment but in dual domain alignment.

COMPARISON EXAMPLE 6
(Production of Optical Compensatory Sheet A3)

The procedure of Example 14 was repeated except that the temperature for heating the optical compensatory sheet was changed into 155° C., to produce an optical compensatory sheet A3.

The discotic liquid crystal molecules in the produced sheet were observed, and thereby it was confirmed that the molecules were not arranged (i.e., they were in isotropic phase).

EXAMPLE 15
(Production of Optical Compensatory Sheet B1)

The procedure of Example 14 was repeated except that the amount of the ethylene oxide denatured trimethlolpropanetriacrylate (V#360, Osaka Organic Chemicals Co., Ltd.) was changed into 9 weight parts, to produce an optically anisotropic layer.

The produced optically anisotropic layer was heated and observed with a polarizing microscope. As the result, columnar phase was not observed, and the nematic-isotropic transition temperature ($T_{NI}$) and the crystal-nematic transition temperature ($T_{CN}$) of the discotic liquid crystal molecules were found to be 136° C. and 100° C., respectively.

Freshly, the produced optically anisotropic layer was heated at 130° C. for 10 minutes to align the discotic liquid crystal molecules.

The coated layer was exposed to ultraviolet light of a metal halide lamp in the amount of 50° mJ/cm$^2$ while heated at 130° C., to polymerize the terminal vinyl group of the discotic liquid crystal molecule (1) and to fix the alignment. Thus an optical compensatory sheet was produced. In the optically anisotropic layer, the discotic liquid crystal molecules are twisted, and are essentially vertically (homogeneously) aligned.

The Δnd of the produced optical compensatory sheet was measured at 550 nm, and found 440 nm. The twist angle of the discotic liquid crystal molecules was 120°. Further, the alignment of the discotic liquid crystal molecules was observed by means of a polarizing microscope, and thereby it was confirmed that all the molecules were uniformly oriented in mono domain alignment.

COMPARISON EXAMPLE 7
(Production of Optical Compensatory Sheet B2)

The procedure of Example 15 was repeated except that the temperature for heating the optical compensatory sheet was changed into 105° C., to produce an optical compensatory sheet B2.

The Δnd of the produced optical compensatory sheet was measured to find 440 nm. The twist angle of the discotic liquid crystal molecules was 120°. Further, the alignment of the discotic liquid crystal molecules was observed by means of a polarizing microscope, to find two aligning patterns having the same Δnd and the same twist angle but different tilt angles. This indicated that the molecules were arranged not in mono domain alignment but in dual domain alignment.

COMPARISON EXAMPLE 8
(Production of Optical Compensatory Sheet B3)

The procedure of Example 15 was repeated except that the temperature for heating the optical compensatory sheet was changed into 145° C., to produce an optical compensatory sheet B3.

The discotic liquid crystal molecules in the produced sheet were observed, and thereby it was confirmed that the molecules were not arranged (i.e., they were in isotropic phase).

EXAMPLE 16
(Production of Optical Compensatory Sheet C1)

The procedure of Example 14 was repeated except that the amount of the ethylene oxide denatured trimethlolpropanetriacrylate (V#360, Osaka Organic Chemicals Co., Ltd.) was changed into 11 weight parts, to produce an optically anisotropic layer.

The produced optically anisotropic layer was heated and observed with a polarizing microscope. As the result, columnar phase was not observed, and the nematic-isotropic transition temperature ($T_{NI}$) and the crystal-nematic transition temperature ($T_{CN}$) of the discotic liquid crystal molecules were found to be 130° C. and 95° C., respectively.

Freshly, the produced optically anisotropic layer was heated at 120° C. for 10 minutes to align the discotic liquid crystal molecules.

The coated layer was exposed to ultraviolet light from a metal halide lamp in the amount of 50° mJ/cm$^2$ while heated at 120° C., to polymerize the terminal vinyl group of the discotic liquid crystal molecule (1) and to fix the alignment. Thus an optical compensatory sheet was produced. In the optically anisotropic layer, the discotic liquid crystal molecules are twisted, and are essentially vertically (homogeneously) aligned.

The Δnd of the produced optical compensatory sheet was measured at 550 nm, and found 440 nm. The twist angle of the discotic liquid crystal molecules was 1200. Further, the alignment of the discotic liquid crystal molecules was observed by means of a polarizing microscope, and thereby it was confirmed that all the molecules were uniformly oriented in mono domain alignment.

COMPARISON EXAMPLE 9
(Production of Optical Compensatory Sheet C2)

The procedure of Example 16 was repeated except that the temperature for heating the optical compensatory sheet was changed into 100° C., to produce an optical compensatory sheet C2.

The Δnd of the produced optical compensatory sheet was measured to find 440 nm. The twist angle of the discotic liquid crystal molecules was 120°. Further, the alignment of the discotic liquid crystal molecules was observed by means of a polarizing microscope, to find two aligning patterns having the same Δnd and the same twist angle but different tilt angles. This indicated that the molecules were arranged not in mono domain alignment but in dual domain alignment.

COMPARISON EXAMPLE 10
(Production of Optical Compensatory Sheet C3)

The procedure of Example 16 was repeated except that the temperature for heating the optical compensatory sheet was changed into 140° C., to produce an optical compensatory sheet C3.

The discotic liquid crystal molecules in the produced sheet were observed, and thereby it was confirmed that the molecules were not arranged (i.e., they were in isotropic phase).

EXAMPLES 17 TO 19 AND COMPARISON EXAMPLES 11 TO 13
(Production of Liquid Crystal Display)

An STN liquid crystal cell (twist angle: 240°, Δnd: 880 nm) was prepared. Independently, two optical compensatory sheets produced in each of Examples 14, 15 and 16 and Comparison Examples 5, 7 and 9 were laminated so that their optically anisotropic layer sides might face each other and that the director ( direction of a normal line of the discotic core plane) of the discotic liquid crystal molecules in one sheet might be identical with that of the liquid crystal molecules in the other sheet. The thus laminated optical compensatory sheets were provided on the bottom of the STN liquid crystal cell, so that the director of the discotic liquid crystal molecules in the sheets might be arranged at the same direction of the director of the rod-like liquid crystal molecules in the cell along the interface between the cell and the sheets. A pair of polarizing plates were then provided according to crossed Nicols arrangement, to produce a liquid crystal display of an STN mode.

With respect to each produced liquid crystal display, the contrast ratio was measured by means of a measuring device (EZ-Contrast 160D, ELDIM). The results were shown in Table 2.

TABLE 2

| | Sheet | $T_{NI}$ | $T_{CN}$ | Temperature for Alignment (T) | Contrast ratio |
|---|---|---|---|---|---|
| Ex. 17 | A1 | 149° C. | 105° C. | 140° C. | 20 |
| C. Ex. 11 | A2 | 149° C. | 105° C. | 110° C. | 4 |
| Ex. 18 | B1 | 136° C. | 100° C. | 130° C. | 21 |
| C. Ex. 12 | B2 | 136° C. | 100° C. | 105° C. | 3 |
| Ex. 19 | C1 | 130° C. | 95° C. | 120° C. | 19 |
| C. Ex. 13 | C2 | 130° C. | 95° C. | 100° C. | 3 |

EXAMPLE 20
(Production of Optical Compensatory Sheet)

A triacetyl cellulose film (thickness: 100 μm. Fuji Tac, Fuji Photo Film Co., Ltd.) was used as a transparent substrate.

The polyimide of Example 1 was dissolved in a mixed solvent of N-methyl-2-pyrrolidone, butoxyethanol and methyl ethyl ketone in the amount of 4 wt. %. The prepared solution was applied on the transparent substrate by means of a bar coater of #3. After drying at 140° C. for 2 minutes, the applied layer was further heated at 62° C. for 5 minutes to form an orientation layer of 0.51 μm thickness.

The surface of the orientation layer was subjected to a rubbing treatment, and was coated with the coating solution having the following components by means of a bar coater of #11. The coated layer was heated at 130° C. to align the discotic liquid crystal molecules.

| Coating solution for optically anisotropic layer | |
|---|---|
| The following discotic liquid crystal molecule (2) | 100 weight parts |
| The chiral agent used in Example 1 | 1.8 weight parts |
| The alignment promoter (I-1) | 5.0 weight parts |
| A photopolymerization initiator (Irgacure 907, Ciba-Geigy | 0.2 weight part |
| 2-Butanone | 185 weight parts |

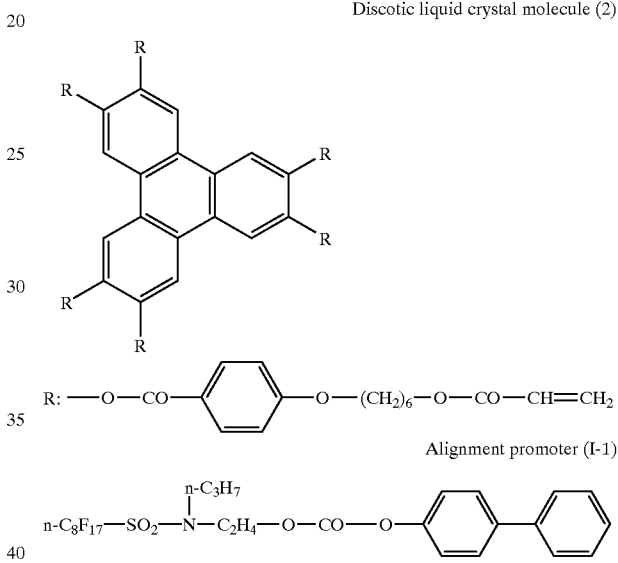

Discotic liquid crystal molecule (2)

Alignment promoter (I-1)

The coated layer was exposed to ultraviolet light of a metal halide lamp in the amount of 50° mJ/cm² while heated at 130° C., to polymerize the terminal vinyl group of the discotic liquid crystal molecule and to fix the alignment. Thus an optical compensatory sheet was produced.

The retardation and the thickness of the produced optical compensatory sheet were measured by ellipsometer to determine 440 nm per 6.2 μm thickness. Further, the alignment of the discotic liquid crystal molecules was observed by means of a polarizing microscope, and thereby it was confirmed that all the molecules were uniformly oriented in mono domain alignment without any defect.

This measurement was further repeated twice. As the result, though there was a slight variation in the retardation per 6.2 μm thickness (second measurement: 444 nm, third measurement: 436 nm), no defect in the alignment was observed in either measurement.

COMPARISON EXAMPLE 14

The procedure of Example 20 was repeated except for not using the alignment promoter (I-1), to produce an optical compensatory sheet.

The retardation and the thickness of the produced optical compensatory sheet were measured by ellipsometer to determine 378 nm per 6.2 μm thickness. Further, the alignment of the discotic liquid crystal molecules was observed by means of a polarizing microscope, and to find many island patterns. This indicated that there were many defects in the alignment.

This measurement was further repeated twice. As the result, there was a variation in the retardation per 6.2 μm thickness (second measurement: 368 nm, third measurement: 390 nm) and many defects in the alignment were observed in either measurement.

EXAMPLE 21
(Production of Liquid Crystal Display)

An STN liquid crystal cell (twist angle: 240°, Δnd: 880 nm) was prepared. Independently, two optical compensatory sheets produced in Example 20 were laminated so that their optically anisotropic layer sides might face each other and that the director (direction of a normal line of the discotic core plane) of the discotic liquid crystal molecules in one sheet might be identical with that of the liquid crystal molecules in the other sheet. The thus laminated optical compensatory sheets were provided on the bottom of the STN liquid crystal cell, so that the director of the discotic liquid crystal molecules in the sheets might be arranged at the same direction of the director of the rod-like liquid crystal molecules in the cell along the interface between the cell and the sheets. A pair of polarizing plates were then provided according to crossed Nicols arrangement, to produce a liquid crystal display of an STN mode.

The produced liquid crystal display was compared with a liquid crystal display having no optical compensatory sheet, and thereby it was confirmed that the optical compensatory sheet remarkably enlarged a viewing angle of the liquid crystal cell.

We claim:

1. An optical compensatory sheet which comprises a transparent substrate and an optically anisotropic layer comprising discotic liquid crystal molecules, wherein the discotic liquid crystal molecules are oriented in essentially mono domain alignment at an average inclined angle of 70° to 90°, said average inclined angle being an average of angles between discotic planes of said discotic liquid crystal molecules and a surface of said transparent substrate.

2. The optical compensatory sheet as defined in claim 1, wherein the optically anisotropic layer contains a cellulose ester in an amount of 0.005 to 0.5 g/m².

3. The optical compensatory sheet as defined in claim 2, wherein the cellulose ester is a cellulose ester of a lower fatty acid.

4. The optical compensatory sheet as defined in claim 1, wherein the optically anisotropic layer contains an alignment promoter in an amount of 0.005 to 0.5 g/m², said alignment promoter being represented by the formula (I):

$$(\text{Hb}—)_m\text{L}(—\text{BU})_n \qquad (I)$$

in which Hb is a hydrophobic group selected from the group consisting of a fluorine-substituted alkyl group, a fluorine-substituted aryl group, an alkyl group having 6 or more carbon atoms, and an alkyl-substituted oligosiloxanoxy group; Bu is a bulky group showing an excluded volume effect and comprising at least two rings; L is an (m+n)-valent linking group; and each of m and n independently is an integer of 1 to 12.

5. The optical compensatory sheet as defined in claim 4, wherein each of m and n in the formula (I) is 1, L in the formula (I) is a divalent linking group selected from the group consisting of an alkylene group, —O—, —CO—, —NR—, —SO₂—and combinations thereof, and R is hydrogen or an alkyl group.

6. The optical compensatory sheet as defined in claim 4, wherein the bulky group of Bu in the formula (I) comprises a tricyclic or tetracyclic condensed ring.

7. The optical compensatory sheet as defined in claim 4, wherein the bulky group of Bu in the formula (I) comprises at least two rings linked by a single bond, a vinylene bond or an ethynylene bond.

8. A liquid crystal display comprising a liquid crystal cell of an STN mode, two polarizing elements placed on both sides of the liquid crystal cell, and one or two optical compensatory sheets placed between the liquid crystal cell and the polarizing element; wherein the optical compensatory sheet comprises a transparent substrate and an optically anisotropic layer comprising discotic liquid crystal molecules in this order from the polarizing element side, said discotic liquid crystal molecules being oriented in essentially mono domain alignment at an average inclined angle of 50° to 90 ° and further being twisted at a twist angle of 90° to 360°, and said average inclined angle being an average of angles between discotic planes of said discotic liquid crystal molecules and a surface of said transparent substrate.

9. An optical compensatory sheet which comprises a transparent substrate and an optically anisotropic layer comprising discotic liquid crystal molecules, wherein the discotic liquid crystal molecules are oriented in essentially mono domain alignment at an average inclined angle of 50° to 90°, and wherein the discotic liquid crystal molecules are twisted at a twist angle of 90° to 360°, said average inclined angle being an average of angles between discotic planes of said discotic liquid crystal molecules and a surface of said transparent substrate.

10. The optical compensatory sheet as defined in claim 9, wherein the optically anisotropic layer contains a cellulose ester in an amount of 0.005 to 0.5 g/m².

11. The optical compensatory sheet as defined in claim 10, wherein the cellulose ester is a cellulose ester of a lower fatty acid.

12. The optical compensatory sheet as defined in claim 9, wherein the optically anisotropic layer contains an alignment promoter in an amount of 0.005 to 0.5 g/m², said alignment promoter being represented by the formula (I):

$$(\text{Hb}—)_m\text{L}(—\text{BU})_n \qquad (I)$$

in which Hb is a hydrophobic group selected from the group consisting of a fluorine-substituted alkyl group, a fluorine-substituted aryl group, an alkyl group having 6 or more carbon atoms, and an alkyl-substituted oligosiloxanoxy group; Bu is a bulky group showing an excluded volume effect and comprising at least two rings; L is an (m+n)-valent linking group; and each of m and n independently is an integer of 1 to 12.

13. The optical compensatory sheet as defined in claim 12, wherein each of m and n in the formula (I) is 1, L in the formula (I) is a divalent linking group selected from the group consisting of an alkylene group, —O—, —CO—, —NR—, —SO₂— and combinations thereof, and R is hydrogen or an alkyl group.

14. The optical compensatory sheet as defined in claim 12, wherein the bulky group of Bu in the formula (I) comprises a tricyclic or tetracyclic condensed ring.

15. The optical compensatory sheet as defined in claim 12, wherein the bulky group of Bu in the formula (I) comprises at least two rings linked by a single bond, a vinylene bond or an ethynylene bond.

16. The optical compensatory sheet as defined in claim 1, wherein the discotic liquid crystal molecules are vertically oriented.

* * * * *